United States Patent Office 3,535,276
Patented Oct. 20, 1970

3,535,276
OLEFIN POLYMERS CONTAINING ORGANIC
PHOSPHATE STABILIZERS
Arthur C. Hecker, Forest Hills, Otto S. Kauder, Jamaica, and William E. Leistner, Brooklyn, N.Y., assignors to Argus Chemical Corporation, Brooklyn, N.Y., a corporation of Delaware
No Drawing. Continuation-in-part of application Ser. No. 569,115, Aug. 1, 1966. This application Mar. 3, 1967, Ser. No. 620,267
Int. Cl. C08f 45/58, 45/60, 45/62
U.S. Cl. 260—45.75                3 Claims

ABSTRACT OF THE DISCLOSURE

This invention provides organic phosphates having attached to a phosphate group in the molecule at least one aliphatic or cycloaliphatic radical and at least one polycarbocyclic aromatic group having the formula $$(Ar)_{n_1}-Y-(Ar)_{n_2}$$

in which Y is a polyvalent linking group, $n_1$ and $n_2$ are integers from one to four, and Ar is a phenolic nucleus, such as a phenyl group. These organic phosphates are effective as stabilizers for olefin polymers alone, and in combination with other heat and light stabilizers for such polymers, and such compositions also are provided.

---

This application is a continuation-in-part of U.S. application Ser. No. 160,237, filed Dec. 18, 1961, now abandoned, U.S. application Ser. No. 240,754, filed Nov. 28, 1962, now abandoned, U.S. application Ser. No. 529,918, filed Feb. 25, 1966, and U.S. application Ser. No. 569,115, filed Aug. 1, 1966, now U.S. Pat. No. 3,476,699.

This invention relates to new organic phosphates, and to synthetic resin and particularly olefin polymer compositions containing the same, and having, as a result, an improved resistance to deterioration, evidenced especially by improved long term stability, when heated at elevated temperatures.

Many organic phosphites have been proposed as stabilizers for olefin polymers, and are employed either alone or in conjunction with other stabilizing compounds, such as polyvalent metal salts of fatty acids and dilauryl thiodipropionate. Such phosphite stabilizers normally contain alkyl or aryl radicals in sufficient number to satisfy the three valences of the phosphite, and typical phosphites are described in the patent literature. Phosphites are also employed in conjunction with polyhydric phenols in the stabilization of polypropylene and other polyolefins against degradation upon heating or ageing under atmospheric conditions. The polyhydric phenol is thought to function as an antioxidant in such combinations. However, the polyhydric phenols are solids and the organic phosphites are liquids, and combinations thereof when sold for use by the converter of the resins are consequently nonhomogeneous slurries. The phenol tends to settle out in the container, and the fact that the composition is in the form of a slurry makes it difficult to incorporate the proper proportions of phenol and phosphite in the resin. Furthermore, phenols have a tendency to impart a dark color to synthetic resins containing them.

In U.S. Pat. No. 3,244,650 to Hecker et al., dated Apr. 5, 1966, there is disclosed one method for avoiding the first problem, i.e., the problem of incompatibility and nonhomogeneity, described above, in combining a polyhydric phenol with an organic phosphite, and a salt of an organic acid and a metal of Group II of the Periodic Table. U.S. Pat. No. 3,255,136, dated June 7, 1966 to Hecker et al. discloses and claims similar combinations including a thiodipropionate. It is there disclosed that by at least partially transesterifying a mixture of the polyhydric phenol and the organic phosphite, a homogeneous product can be obtained.

Organic phosphates have also been propsed as stabilizers for olefin polymers, but they had not come into use to the extent of the phosphites. They also present problems of homogeneity and compatibility, as well as a relatively lower stabilizing effectiveness than a phosphite of like structure. The phosphates which have been proposed to overcome those problems have not been entirely successful, partly because of their complicated structure, which makes them costly to prepare, and partly because of their difficulty of preparation. It is important if the phosphate is to be competitive with the simple triphosphates that it be prepared from readily available and inexpensive starting materials, and that it be prepared by a simple process.

U.S. Pat. No. 3,245,949 to Murdock, dated Apr. 12, 1966, discloses polymeric aryl phosphates, which contain only aryl substituents, including bisphenyl groups which contain either free phenolic hydroxyl groups or alkali metal salts thereof. These contain a plurality of such phenolic or phenolate groups per molecule, and have a molecular weight in excess of 350. These are solids, and can be dispersed in polypropylene and other olefin polymers with the aid of a solvent.

U.S. Pat. No. 3,254,973 to Glammaria and Becker, dated June 7, 1966, discloses bisphenyl phosphates in which the bisphenyl group forms a link with oxygen atoms of two phosphate groups. These are indicated as useful in inhibiting rumble and deposit-induced pre-ignition of spark-ignition internal combustion engines, and for this purpose are added to lead-containing motor fuels.

In accordance with the invention, organic phosphates are provided (1) having attached to a phosphate group in the molecule at least one radical selected from the group consisting of aliphatic and cycloaliphatic groups, and (2) having attached to each phosphate group at least one polycarbocyclic aromatic group having the formula:

$$(Ar)_{n_1}-Y-(Ar)_{n_2}$$

wherein:
Y is a polyvalent linking group selected from the group consisting of oxygen; aliphatic, cycloaliphatic and aromatic hydrocarbon groups attached to each Ar group through a carbon atom not a member of an aromatic ring; oxyaliphatic; thioaliphatic; oxycycloaliphatic, thiocycloaliphatic; heterocyclic; oxyheterocyclic, thioheterocyclic, carbonyl, sulfinyl; and sulfonyl groups. Y can be a sulfide group $(-S-)_x$, wherein $x$ is one or more, up to about ten. $n_1$ and $n_2$ are integers from one to four.

Ar is a phenolic nucleus which can be phenyl or a polycarbocyclic group having condensed or separate phenyl rings; each Ar group is either connected through an oxygen atom to a phosphate group or contains a free phenolic hydroxyl group, or both.

The remaining groups of the phosphate are selected from the group consisting of hydrogen, monovalent and bivalent aliphatic, cycloaliphatic, aromatic and heterocyclic groups having from one to about thirty carbon atoms, all of the groups being attached to the phosphate phosphorus atom through oxygen.

The phosphates of the invention combine in one molecule the stabilizing effectiveness associated with organic phosphates as well as the antioxidant effectiveness of the phenols. Antioxidant effectiveness is found in phosphate esters having aromatic groups attached directly through oxygen to the phosphorus of the phosphate, whether or not a free phenolic hydroxyl group is present; but compounds having free phenolic hydroxyl groups appear to have an enhanced antioxidant effectiveness, so that preferably at least one of the $(Ar)_{n_1}$—Y—$(Ar)_{n_2}$ groups per molecule has a free phenolic hydroxyl group.

Polymeric phosphates wherein the molecule is made up of a chain of phosphate groups linked to $$(Ar)_{n_1}\text{—Y—}(Ar)_{n_2}$$

groups are also contemplated.

In the above formulae, $R_1$ is hydrogen or a monovalent aliphatic or cycloaliphatic group, $R_2$ is a monovalent aliphatic, cycloaliphatic, aromatic or heterocyclic group, and $R_3$ is a bivalent aliphatic or cycloaliphatic group. Any $(Ar)_{n_1}$—Y—$(Ar)_{n_2}$ groups can be cross-linked to other phosphate groups.

The polymeric organic phosphate esters have the general formula:

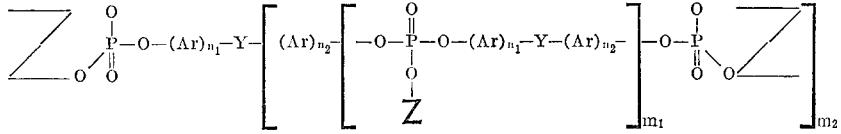

wherein Ar and Y are as defined above, and at least one of the Z's is a cycloaliphatic or aliphatic group, the aliphatic and cycloaliphatic groups being present in sufficient number to impart an enhanced stabilizing effectiveness for polyolefin resins to the phosphate, and $m_1$ and $m_2$ represent the number of such bracketed repeating units in each chain, and can range from zero to an indefinite upper limit, depending upon the molecular weight of the polymer. Inasmuch as compatibility with the synthetic resin may decrease at very high values of $m_1$ and $m_2$ when the polymers tend to become resinous in nature, usually $m_1$ and $m_2$ do not exceed ten, and preferably do not exceed five.

These phosphates have been found to be highly effective stabilizers for synthetic resins, particularly for polyolefins. The effectiveness of these phosphates is at least in part due to the presence in the molecule of both aliphatic or cycloaliphatic and bicyclic aromatic groups.

The compounds of the invention surprisingly are more effective as stabilizers than phosphates and phenols taken in combination, but as separate compounds, in the same relative amounts as the phosphate and phenol moieties of the phosphates of the invention. Apparently, the association of the groups in the same molecule has an enhancing effect. Furthermore, the presence of at least one aliphatic or cycloaliphatic group attached to a phosphate group in the molecule also has a substantial effect in enhancing the stabilizing effectiveness of the phosphate. Usually, in a molecule containing several phosphate groups there should be at least one aliphatic or cycloaliphatic group attached to phosphorus through oxygen for every ten phosphate groups, and preferably at least one for every eight phosphate groups. The compounds of the invention having two phosphate groups as a minimum per molecule are generally more effective stabilizers than compounds having one phosphate group and the same relative proportion of phenolic groups.

The compounds of the invention are in many cases liquids or low melting resinous solids, particularly where the molecular weight is low, and are compatible with synthetic resins such as polyolefins in the proportions required for stabilization.

The organic phosphates of this invention can be defined by the formula:

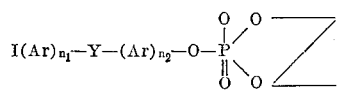

wherein Z is selected from the group consisting of hydrogen and aliphatic, cycloaliphatic, aromatic, heterocyclic, and $(Ar)_{n_1}$—Y—Ar groups, taken in sufficient number to satisfy the valences of the two phosphate oxygen atoms. At least one Z group is an aliphatic or cycloaliphatic group, and $n_1$, $n_2$, Y and Ar are as defined above.

Exemplary of types of phosphates falling within the above general formula are the following:

Z can be monovalent or polyvalent, inasmuch as Z can be a plurality of radicals taken separately to satisfy the valences of the phosphate oxygen atoms to which Z is attached. Furthermore, Z can be a bivalent radical forming a heterocyclic ring with the oxygen atoms, or when present in the repeating unit can form a cross-link to adjacent polyphosphate chains of like type. Thus, Z when bivalent can be an aliphatic bivalent group, an aromatic bivalent group, a cycloaliphatic bivalent group and a heterocyclic bivalent group. Z when monovalent can include an aliphatic, cycloaliphatic, aromatic or heterocyclic group, as well as one hydrogen atom. Thus, the invention encompasses acid phosphates as well as neutral triphosphates.

It will be apparent then $m_2$ is one and the Z radicals present in the repeating unit of the polymeric phosphate are monovalent, the polyphosphates of the invention exist as linear chains, and when the Z radicals in the repeating units are bivalent cross-links, the polyphosphates take the form of cross-linked polymers.

The polyphosphates which exist as cross-linked polymers wherein the Z of the repeating unit is a cross-link to an adjacent chain can take a variety of forms, only some of which because of space limitations can be represented here. The following formulae are exemplary of cross-linked polymers:

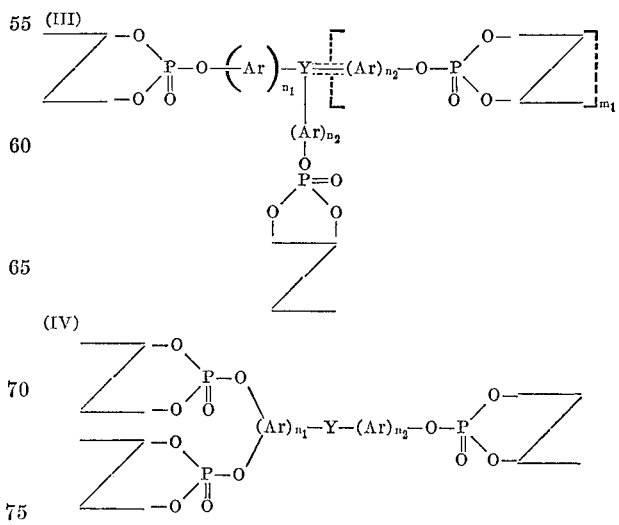

(V) 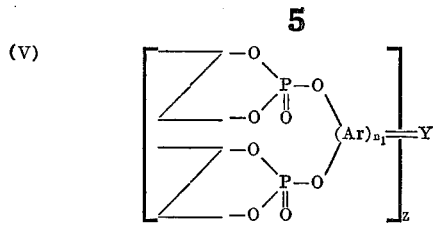

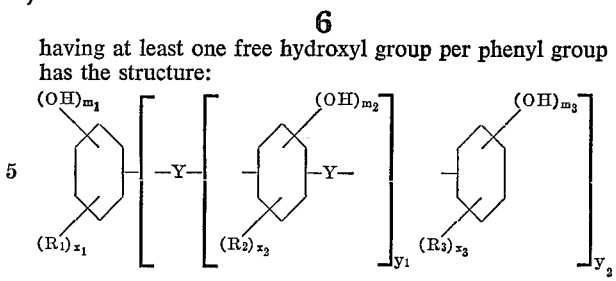

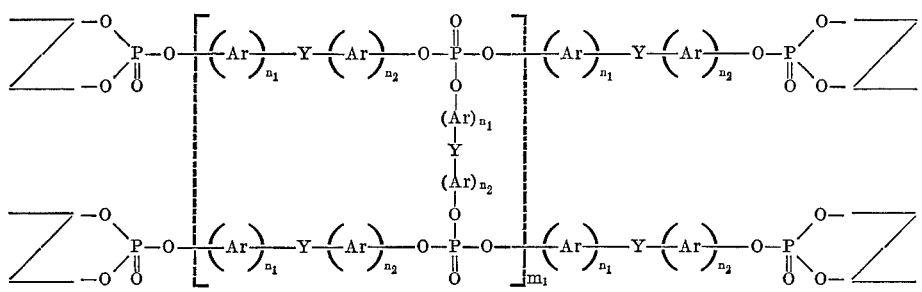

In all of the above formulae, the Z groups will normally have a total of from one to about thirty carbon atoms, and preferably from about two to ten carbon atoms. Z groups when bivalent will usually have at least two carbon atoms where they form a heterocyclic ring with two oxygen atoms of a phosphate group. $m_1$ and $m_2$ are numbers greater than zero and preferably from one to three.

The Ar group can be any aromatic nucleus, monocarbocyclic or polycarbocyclic, with condensed or separate rings, at least two rings are separate and are connected by a bivalent linking nucleus of the type of Y, for example, Ar—Y—Ar—Y—Ar. Ar can contain one or more free phenolic hydroxyl groups. Thus, the polycarbocyclic aromatic group can be represented as follows:

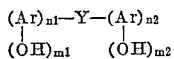

wherein Y is a polyvalent linking group selected from the group consisting of oxygen; sulfur; aliphatic, cycloaliphatic and aromatic hydrocarbons; oxyhydrocarbon; thiohydrocarbon; heterocyclic; carbonyl; sulfinyl; and sulfonyl groups, and has up to twenty carbon atoms.

$m_1$ and $m_2$ have a value from 0 to 4.

$n_1$ and $n_2$ have a value from one to four.

The aromatic nucleus Ar can, in addition to phenolic hydroxyl groups, include one or more inert substituents. Examples of such inert substituents include hydrogen, halogen atoms, e.g. chlorine, bromine and fluorine; organic radicals containing from one to about thirty carbon atoms, such as alkyl, aryl, alkenyl, alkaryl, aralkyl, cycloalkenyl, cycloalkyl, alkoxy, aryloxy and acyloxy

where R' is aryl, alkyl or cycloalkyl, or thiohydrocarbon groups having from one to about thirty carbon atoms, and carboxyl

groups. Usually, however, each aromatic nucleus will not have more than about eighteen carbon atoms in any hydrocarbon substituent group. The Ar group can have from one to four substituent groups per nucleus.

Typical aromatic nuclei include phenyl, naphthyl, phenanthryl, triphenylenyl, anthracenyl, pyrenyl, chrysenyl, and fluorenyl groups.

The simplest form of polyhydric polyphenyl phenol having at least one free hydroxyl group per phenyl group has the structure:

wherein $R_1$, $R_2$ and $R_3$ are inert substituent groups as set forth above, $m_1$ and $m_3$ are integers from one to a maximum of five, $m_2$ is an integer from one to a maximum of four, $x_1$ and $x_3$ are integers from zero to four, and $x_2$ is an integer from zero to three; $y_1$ can be an integer from zero to about six and $y_2$ can be an integer from one to five, preferably one or two.

Preferably, the hydroxyl groups are located ortho and/or para to Y, and there is only one hydroxyl group per phenyl nucleus.

Exemplary Y groups are alkylene, alkylidene, alkenylene, arylalkylene, aralkylidene, cycloalkylene and cycloalkylidene, and oxa- and thia-substituted such groups, carbonyl groups, tetrahydrofuranes, carboxylic esters and triazine groups. The Y groups are usually bi-, tri-, or tetravalent, connecting two, three or four Ar groups. However, higher valence Y groups, connecting more than four Ar groups, can also be used. According to their constitution the Y groups can be assigned to subgenera as follows:

(1) Y groups made up of a single carbon carrying at least one hydrogen with other substituents linking two Ar nuclei, such as

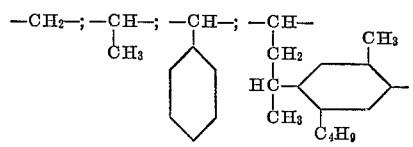

and

(2) Y groups made up of a single carbon carrying only substituents other than hydrogen, such as

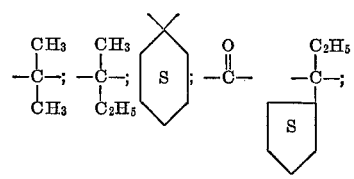

and

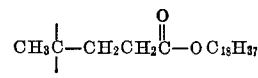

(3) Y groups where at least two carbons connect the aromatic groups in an open-chain or cyclic arrangement, such as

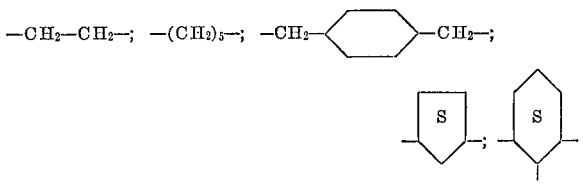

(4) Y groups where only atoms other than carbon link the aromatic rings, such as

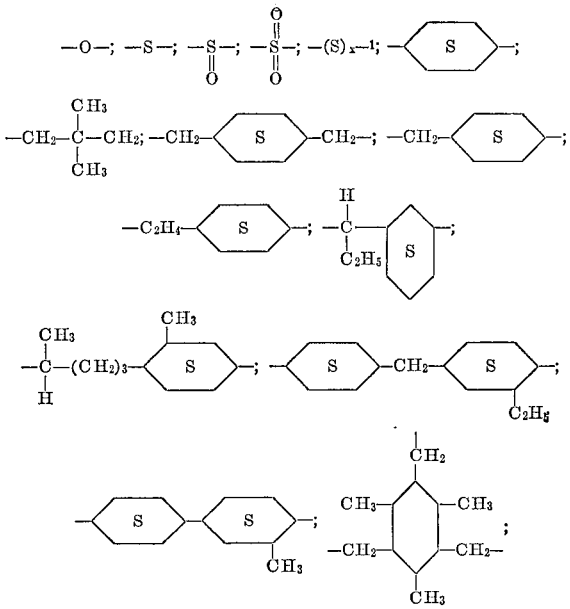

and

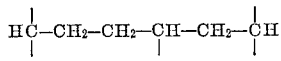

¹ x is an integer from one to about ten.

(5) Y groups made up of more than a single atom including both carbon and other atoms linking the aromatic nuclei, such as:

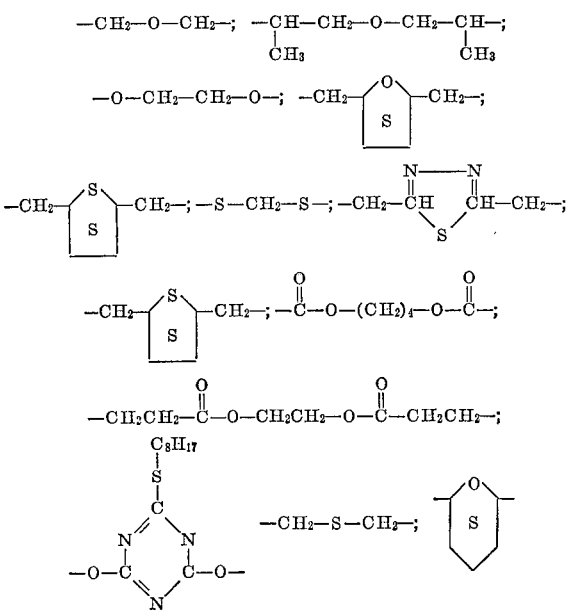

and

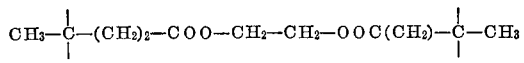

Although the relation of effectiveness to chemical structure is insufficiently understood, many of the most effective groups have Y groups of subgenus 3, and accordingly this is preferred.

Exemplary polyhydric polycyclic Ar groups in accordance with the instant invention are those derived from 4,4′-methylenebis-(2-tertiary-butyl-5-methyl-phenol),
2,2′-bis(4-hydroxyphenyl) propane,
methylenebis-(p-cresol),
4,4′-oxobis-phenol,
4,4′-oxobis(3-methyl-5-isopropyl-phenol),
4,4′-oxobis-(3-methyl-phenol),
2,2′-oxobis(4-dodecyl-phenol),
2,2′-oxobis(4-methyl-5-tertiary-butyl-phenol),
4,4′-n-butylidenebis-(2-t-butyl-5-methyl-phenol),
2,2′-methylenebis[4-methyl-6-(1′-methyl-cyclohexyl)-phenol],
4,4′-cyclohexylidenebis(2-tertiary-butyl-phenol),
2,6-bis-(2′-hydroxy-3′-t-butyl-5′-methyl-benzyl)-4-methyl-phenol,
4,4′-oxobis-(naphthalene-1,5-diol),
1,2′-methylenebis(naphthalene-1,8-diol),
1,3′-bis(naphthalene-2,5-diol)propane, and
2,2′-butylidenebis(naphthalene-2,7-diol),
di(hydroxyphenyl)ketone,
(3-methyl-5-tert-butyl-4-hydroxyphenyl)-(4′-hydroxyphenyl)methane,
2,2′-methylenebis-(4-methyl-5-isopropylphenol),
2,2′-methylenebis(5-tert-butyl-4-chlorophenol),
(3,5-di-tert-butyl-4-hydroxyphenyl)-(4′-hydroxyphenyl)methane,
(2-hydroxyphenyl)-(3′,5′-di-tert-butyl-4′-hydroxyphenyl)methane,
2,2′-ethylidenebis(4-octylphenol),
4,4′-isopropylidenebis(2-tert-butyl-phenol),
2,2′-isobutylidenebis-(4-nonylphenol),
2,4-bis(4-hydroxy-3-t-butylphenoxy)-6-(n-octylthio)-1,3,5-triazine,
2,4,6-tris(4-hydroxy-3-t-butylphenoxy)-1,3,5-triazine,
2,2′-bis-(3-t-butyl-4-hyroxyphenyl)thiazolo-(5,4-d)thiazole,
2,2′-bis(3-methyl-5-t-butyl-4-hydroxyphenyl)-thiazolo-(5,4-d)-thiazole,
4,4′-bis(4-hydroxyphenyl)pentanoic acid octadecyl ester,
cyclopentylidene 4,4′-bisphenol,
2-ethylbutylidene-4,4′-bisphenol,
4,4′-cyclooctylidenebis(2-cyclohexylphenol),
β,β-thiodiethanolbis(3-tert-butyl-4-hydroxyphenoxy acetate),
1,4-butanediolbis(3-tert-butyl-4-hydroxyphenoxy acetate),
pentaerythritoltetra(4-hydroxyphenol propionate),
2,4,4′-trihydroxy benzophenone,
bis(2-tert-butyl-3-hydroxy-5-methylphenyl) sulfide,
bis(2-tert-butyl-4-hydroxy-5-methylphenyl) sulfide,
bis(2-tert-butyl-4-hydroxy-5-methylphenyl) sulfoxide,
bis(2-hydroxy-4-methyl-6-tert-butyl phenyl) sulfide,
4,4′-bis(4-hydroxyphenyl) pentanoic acid octadecyl thiopropionate ester,
1,1,3-tris-(2′-methyl-4′-hydroxy-5′-tert-butylphenyl) butane,
1,1,3-tris(1-methyl-3-hydroxy-4-tert-butylphenyl) butane,
1,8-bis-(2-hydroxy-5-methylbenzoyl)-n-octane,
2,2′-methylene-bis-[4′-(3-tert-butyl-4-hydroxyphenyl)-thiazole],
1-methyl-3-(3-methyl-5-tert-butyl-4-hydroxybenzyl) naphthalene,
2,2′-(2-butene)bis-(4-methoxy-6-tert-butyl phenol).

The polyhydric polycyclic Ar groups can also include condensation products of phenol or alkyl phenols with aldehydes, for example, formaldehyde, acetaldehyde, and propionaldehyde, or with ketones, for example, acetone.

The polyhydric polycyclic Ar groups can also be condensation products of phenol or alkylphenols with hydrocarbons having a bicyclic ring structure and a double bond or two or more double bonds, such as α-pinene, β-pinene, dipentene, limonene, vinylcyclohexene, dicyclopentadiene, alloocimene, isoprene, and butadiene. These condensation products are usually obtained under acidic conditions in the form of more or less complex mixtures of monomeric and polymeric compounds. However, it is usually not necessary to isolate the individual constituents. The entire reaction product, merely freed from the acidic condensation catalyst and unchanged starting material, can be used with excellent results. While the exact structure of these phenolic condensation products is uncertain, the Y groups linking the phenolic nuclei all fall into the preferred subgenus 3. For methods of preparation see e.g. U.S. Pat. No. 3,124,555, U.S. Pat. No. 3,242,135 and British Pat. No. 961,504.

Typical Z monovalent organic radicals include alkyl groups, such as methyl, ethyl, propyl, isopropyl, butyl, isobutyl, secondary butyl, tertiary butyl, amyl, isoamyl hexyl, isohexyl, secondary hexyl, heptyl, octyl, isooctyl 2-ethylhexyl, nonyl, decyl, undecyl, dodecyl, tetradecyl, tridecyl, octadecyl, and behenyl, and interrupted alkyl groups such as ethoxyethyl, butoxy ethoxyethyl, and ethoxy propoxypropyl.

Typical monovalent aryl radicals include phenyl, benzyl, phenethyl, xylyl, tolyl and naphthyl, phenoxyethyl and 6-p-chlorophenoxyhexyl.

Typical monovalent cycloaliphatic radicals include cyclohexyl, cyclopentyl, and cycloheptyl, cyclooctyl, cyclodecyl and cyclododecyl, and monovalent heterocyclic radicals include pyridyl, tetrahydrofurfuryl, furyl and piperidinyl.

Typical bivalent X groups include ethylene; propylene; octylene; 2-ethyl hexylene; 1,4-cyclohexylene; 1,2-cyclohexylene; butylene; 1,3-cyclopentylene; phenylene; phenethylene;

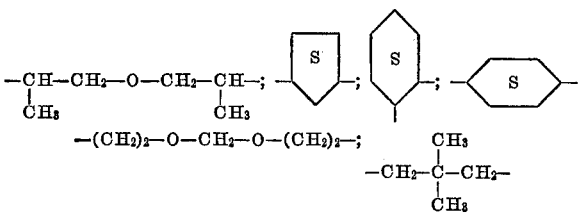

The following compounds are illustrative of phosphates falling within the invention:

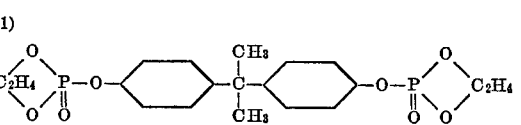

(4) 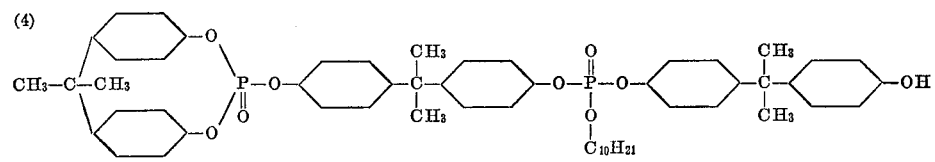
(5) 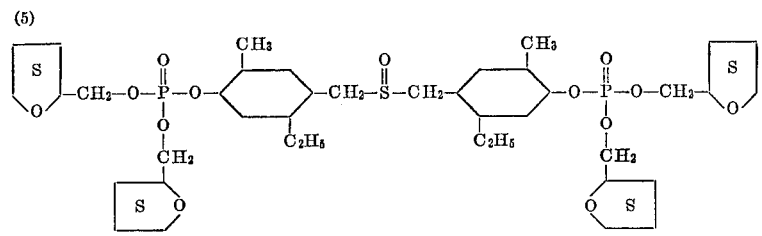
(6) 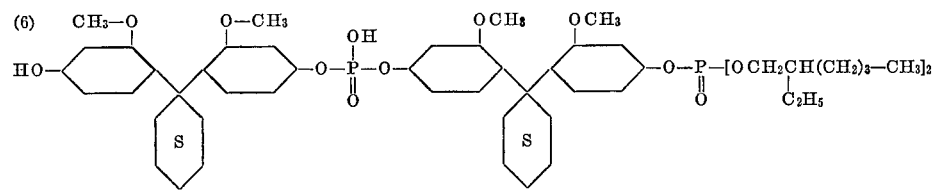
(7) 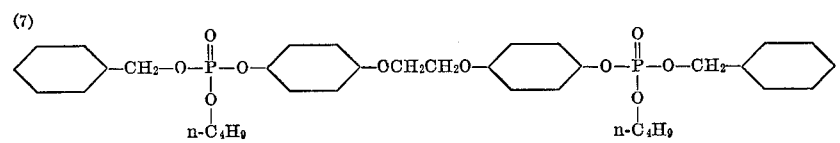
(8) 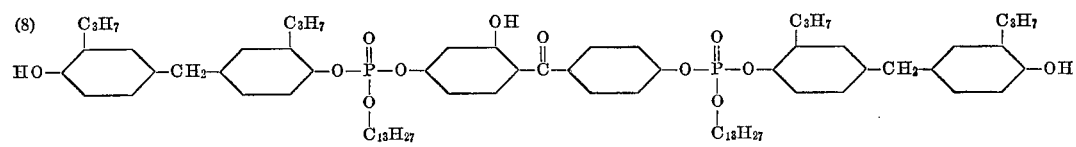
(9) 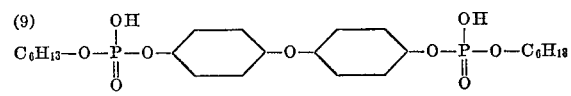
(10) 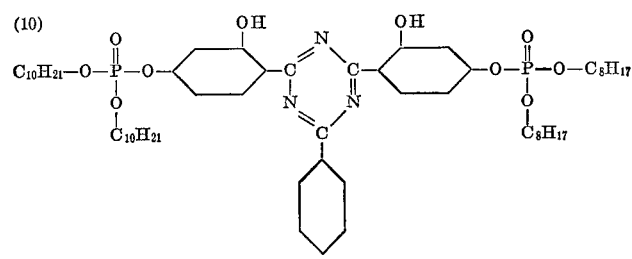
(11) 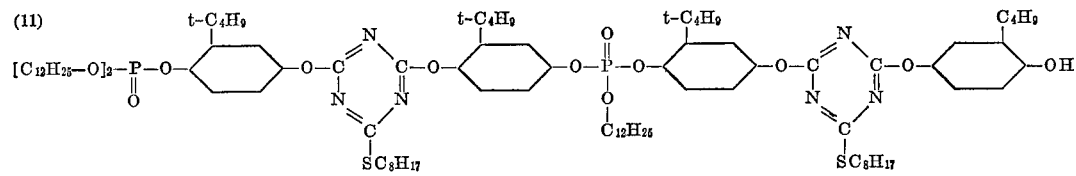
(12) 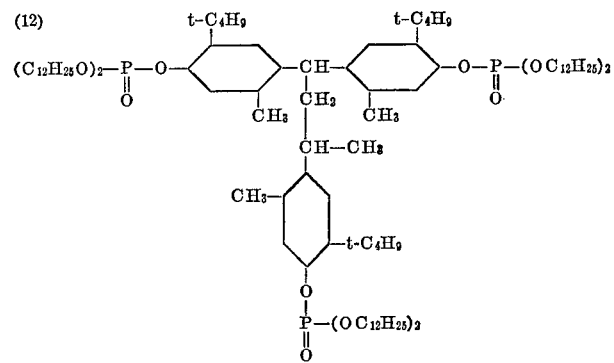

(13)
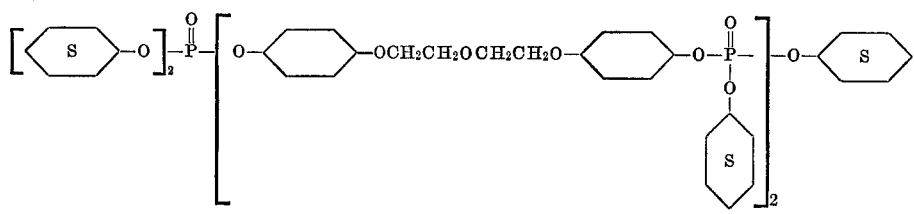
(14)
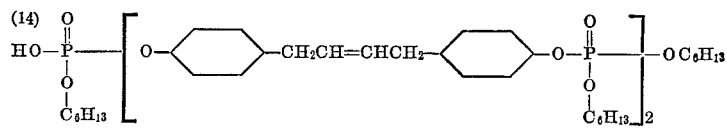
(15)
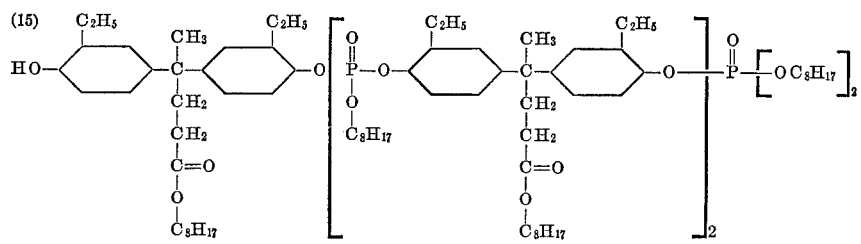
(16)
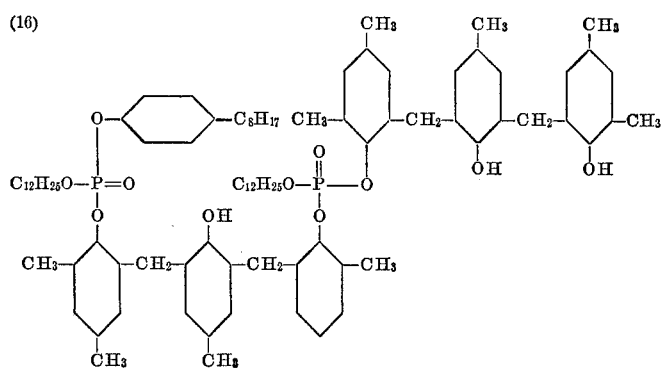
(17)
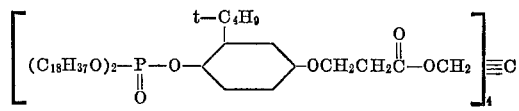
(18)
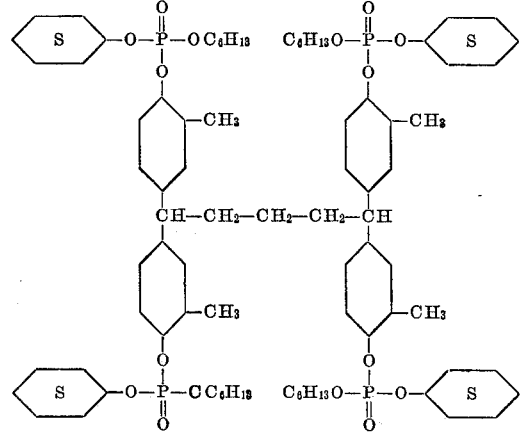

(19)
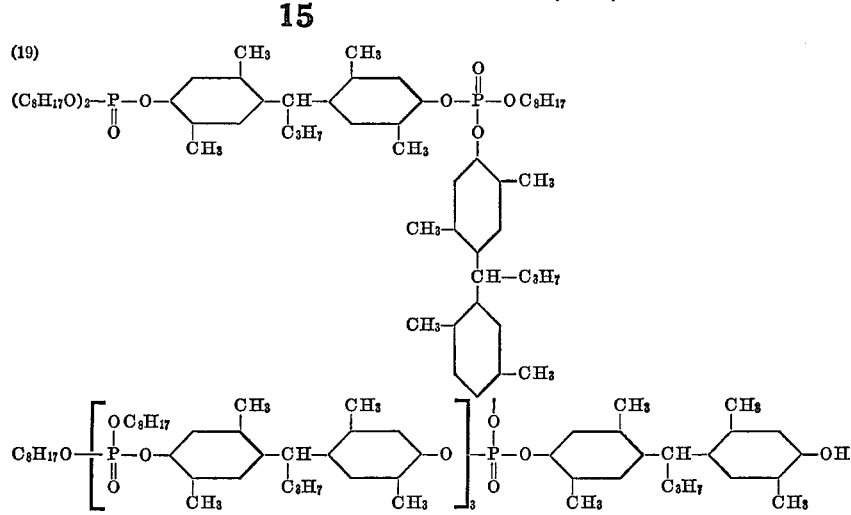
(20)
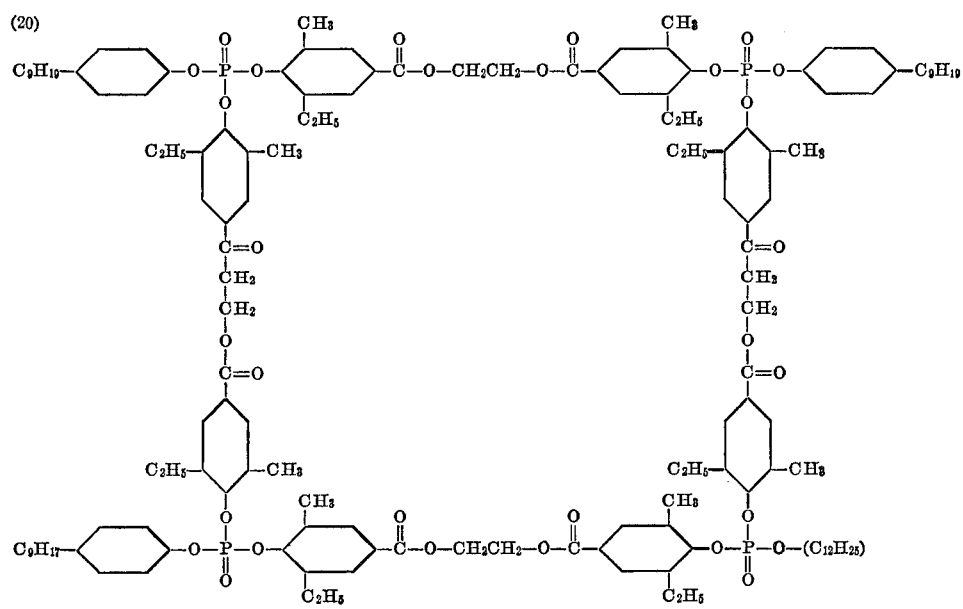
(21)
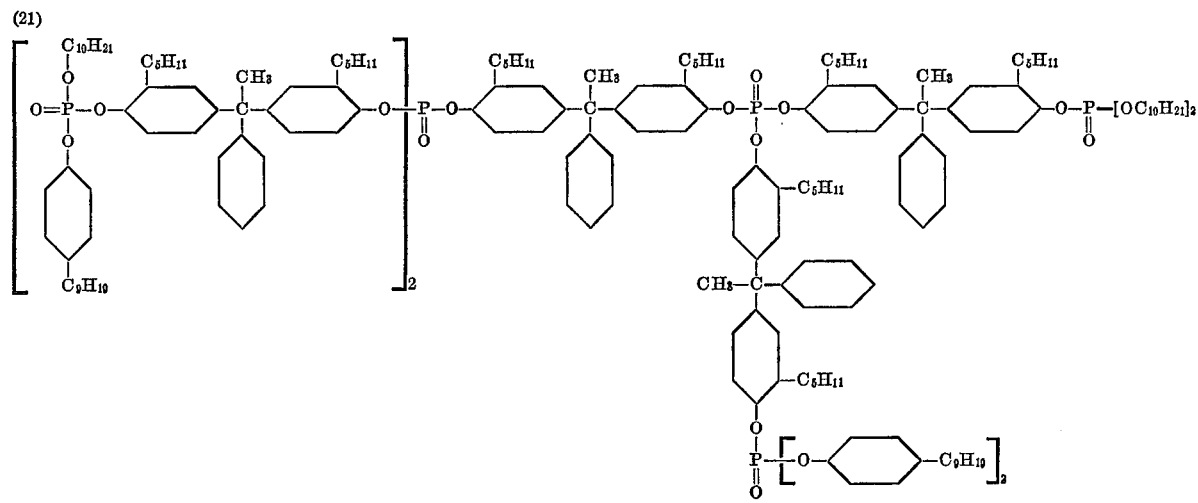
(22)
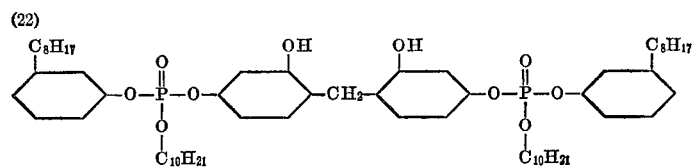

(23) 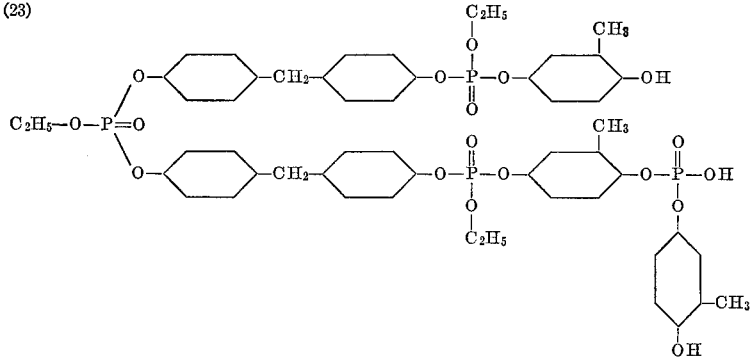

(24) 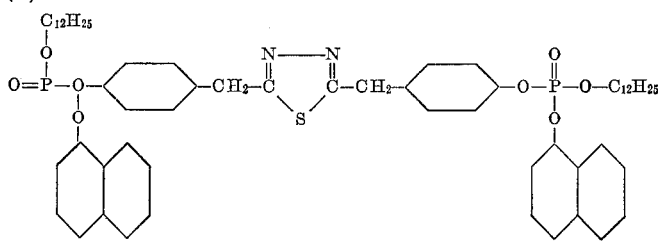

(25) 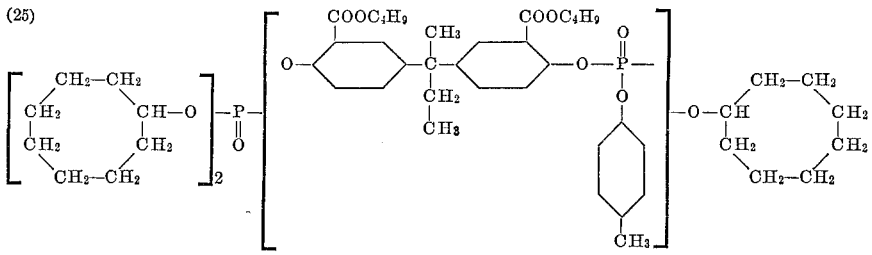

(26) 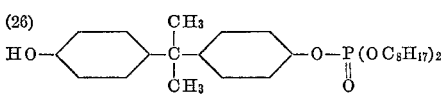

(27) 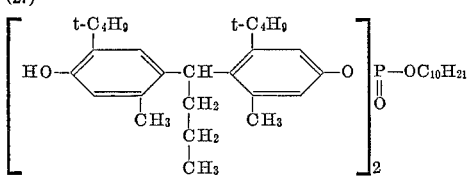

(28) 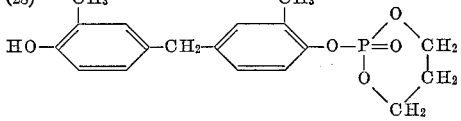

(29) 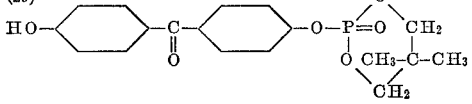

(30) 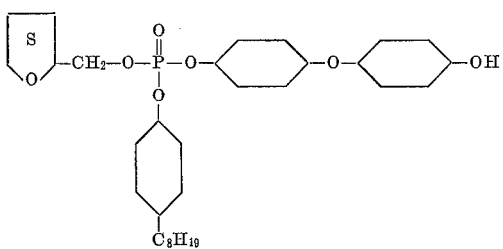

(31) 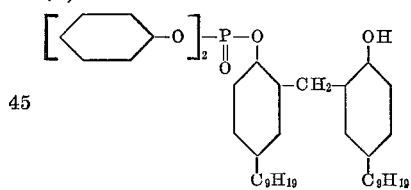

(32) 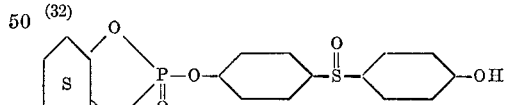

(33) 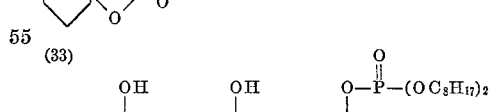

The phosphate esters of the invention can be obtained by the classical method of reacting the desired polyphenols and alcohols with POCl₃ in the presence of basic HCl acceptors such as tertiary amines; alternatively, the phosphate esters can be obtained by first reacting the polyphenols with POCl₃ without basic catalyst to form the aryl chlorophosphates and then reacting the aryl chlorophosphates with alcohol in the presence of tertiary amines, or by first reacting POCl₃ and alcohol under mild conditions to give alkyl chlorophosphate, then reacting the alkyl chlorophosphate with the alkali salt of the polyphenol (cf. U.S. Pat. No. 2,504,121). The phosphate ester compounds of the invention are also obtained quite readily by oxidizing the phosphites made by transesterifying an aliphatic and/or cycloaliphatic phosphite having the desired aliphatic and/or cycloaliphatic groups with a polycyclic polyhydric phenol, or alternatively, by transesterifying an aryl phosphite with a polycyclic polyhydric phenol and an aliphatic and/or cycloaliphatic alcohol. One can also transesterify a mixture of phenolic phosphites and aliphatic and/or cycloaliphatic phosphites to obtain a final product with the desired proportion of aliphatic and/or cycloaliphatic radicals in the molecule.

The transesterification reaction proceeds with the replacement of some or all of the substituent radicals of the phosphite by the polycyclic polyhydric phenol and aliphatic and/or cycloaliphatic alcohol present. The extent of the transesterification is determined by the proportion of phenol and/or alcohol equivalents to phosphite equivalents in the reaction mixture. Any other Z groups which can be present in the product of this invention, e.g., heterocyclic groups, and hydrogen atoms, can be present in the phosphite reactant, or added during the transesterification, e.g., heterocyclic alcohol such as tetrahydrofurfuryl alcohol, pyridinemethanol and 2-pyridinol.

The phosphite is then oxidized to the phosphate by hydrogen peroxide as described in U.S. Pat. No. 3,056,824, or peracetic acid, particularly peracetic acid in an anhydrous solvent medium, as described in British specification No. 999,793, published July 28, 1965, and desirably using an alkaline buffer. Other oxidizing agents that can be used include ozone, dinitrogen tetroxide, perphthalic acid and perbenzoic acid, and N-halo amides such as N-bromosuccinimide, N-bromoacetamide, chlorinated dimethylhydantoin, N-chlorourea, and chloramine T.

An alternative method is to prepare the phosphites from phosphorous trichloride. $PCl_3$ is first reacted with a polycyclic polyhydric phenol, alone or mixed with another phenol, and then the aromatic phosphite is transesterified with the desired proportion of an aliphatic and/ or cycloaliphatic alcohol. The other Z groups can also be added in this manner when desired. This phosphite is then oxidized to the phosphate, as above.

The molar proportions of the phosphate and polyhydric polycyclic phenolic groups in the compounds of this invention depend upon the proportions of these ingredients used as starting materials. The structure of the phosphate will depend upon the manner in which such proportions of polyhydric phenol and phosphate can associate in the molecule, and if a variety of structures is theoretically possible, one or several or all of such possibilities can be obtained in admixture in the final products, depending to some degree upon the preparatory procedure. The more complex the possibilities, the more difficult it will be to elucidate the composition of the final product. However, the examples given above serve as an indication of the types of product obtainable at typical molar ratios of phosphate and phenol.

Proof of structure of these phosphates is a difficult problem. The phosphates are stable products, well suited to analytical methods such as vapor phase, thin layer and paper chromatography.

It is preferred in most cases to direct the reaction towards formation of a monomer, dimer or linear polymer rather than a cross-linked polymer. The latter polymers are formed under high temperatures and long reaction times from linear polymers containing free hydroxyl groups at intermediate points in the chain. Accordingly, the reaction should be arrested at the linear stage.

One method for ensuring monomer or linear polymer formation in transesterification of phosphites is by introducing a monovalent chain-stopper into the system. For example, by using an alkyl aryl phosphite as the starting phosphite, of which the aryl groups are more easily replaceable by the polycyclic phenol, in transesterification reactions, or by adding a monohydric alcohol with the polycyclic phenol when using triaryl phosphite as the starting phosphite, cross-linking will be kept to a minimum. Control of the phosphite-phenol ratio can also serve to prevent such polymer formation.

The transesterification reaction will proceed in the absence of a catalyst, but a faster and more complete reaction is obtained if a catalyst is used. The catalyst employed ordinarily for transesterification is an alkali or alkaline earth metal, which can be added in the form of the metal or in the form of an alkaline compound, such as an alkaline oxide or hydroxide, or alkaline salt; such as the carbonate or hydride, or as the alcoholate. Sodium is quite satisfactory, and so are sodium hydroxide, lithium carbonate, sodium carbonate, potassium carbonate, lithium hydroxide, potassium hydroxide, sodium hydride, lithium hydrided, potassium hydride, calcium hydride, the oxides and hydroxides of calcium, strontium and barium, and the alcoholates, usually of methyl, ethyl or isopropyl alcohol, or phenolates of all of these metals. Only a very small amount of the catalyst need be employed, for example, as little as from 0.01 to 2% by weight of the phosphite. Other catalysts which are especially useful for the reaction between aromatic phosphites and cycloaliphatic or aliphatic alcohols include strongly basic tertiary amines, e.g., triethylamine tributylamine, pyridine, etc.

Alternative catalysts include certain acidic materials such as dihydrocarbon or dihaloaryl phosphites. Examples of such compounds are diphenyl phosphite, didecyl phosphite, dimethyl phosphite, dioctadecyl phosphite, di-p-toyl phosphite, di-o-tolyl phosphite, di-m-tolyl phosphite, di-2,4-dimethylphenyl phosphite, di-p-butylphenyl phosphite dinapthyl phosphite, di-p-chlorophenyl phosphite, di-o-bromophenyl phosphite, dineodecyl phosphite, and dineopenyl phosphite.

It is usually desirable that the reactants be anhydrous, although very small amounts of water can be tolerated in the system. If sodium or potassium or the oxides of calcium, barium and strontium are added, they will react with the water or alcohol present to form the corresponding hydroxide or alcoholates, and the latter compound will then serve as a catlyst. A volatile alcohol, such as ethanol, methanol or isopropyl alcohol, can be added as a solvent, if the reactants are incompatible.

The reactants, i.e., polycyclic polyhydric phenol, any polyhydric alcohol, monohydric alcohol or phenol, the phosphite, and the catalyst, are mixed, and the reaction mixture then heated at an elevated temperature, usually under reflux. A temperature within the range from about 20° to about 150° C. can be employed. The alcohol or phenol corresponding to the alkyl or aryl group of the phosphite being substituted by the polycyclic phenol or the alcohol is liberated in the course of the reaction and, in order to drive the reaction to completion, it is usually desirable to continuously distill off the liberated alcohol or phenol. The reaction can be carried out for several hours' time, and the alcohol or phenol then distilled out, in order to drive the reaction to completion. Vacuum distillation can be used if the phenol or alcohol has a high boiling point. The phosphite is then oxidized to phosphate, as described in U.S. Patent No. 3,056,824, for example.

Exemplary polycyclic phenols used in preparing phosphates of the invention are 4,4'-methylenebis-(2-tertiary-butyl-6-methyl-phenol)
2,2'-bis(4-hydroxy-phenyl) propane,
methylenebis-(p-cresol), 4,4'-oxobisphenol,
4,4'-oxobis-(3-methyl-6-isopropyl-phenol),
4,4'-oxobis(3-methyl-phenol),
2,2'-oxobis(4-dodecyl-phenol),
2,2'-oxobis(4-dodecyl-phenol),
2,2'-oxobis(4-methyl-6-tertiary-butyl-phenol),
4,4'-n-butylidenebis-(2-t-butyl-5-methyl-phenol),
2,2'-methylene-bis-[4-methyl-6,(1'-methyl-cyclohexyl)-phenol]

4,4'-cyclohexylidenebis-(2-tertiary-butyl-phenol),
2,6-bis-(2'-hydroxy-3'-t-butyl-5'-methyl-benzyl)-4-
   methyl-phenol,
4,4'-oxobis(naphthalene-1,5-diol),
1,2'-methylenebis(naphthalene-1,8-diol),
1,3'-bis(naphthalene-2,5-diol)propane, and 2,2-butyli-
   denebis(naphthalene-2,7-diol),
di(hydroxyphenyl)ketone,
(3-methyl-5-tert-butyl-4-hydroxyphenyl)-(4'-hydroxy-
   phenyl)methane,
2,2'-methylenebis(4-methyl-6-isoporpylphenol),
2,2-methylenebis(6-tert-butyl-4-chloropenol),
(3,5-di-tert-butyl-4-hydroxyphenyl)-(4'-hydroxyphenyl)-
   methane,
(2-hydroxyphenyl)-(3',5'-di-tert-butyl-4'-hydroxy-
   phenyl)methane,
2,2'-ethylidenebis(4-octylphenol),
4,4'-isopropylidenebis(2-tert-butyl-phenol),
2,2'-isobutylidenebis-(4-nonylphenol),
2,4-bis(4-hydroxy-3-t-butylphenoxy)-6-(n-octylthio)-
   1,3,5-triazine,
2,4,6-tris(4-hydroxy-3-t-butylphenoxy)-1,3,5-triazine,
2,2'-bis-(3-t-butyl-4-hydroxyphenyl)thiazolo-(5,4-d)
   thiazole,
2,2'-bis(3-methyl-5-t-butyl-4-hydroxyphenyl)-thiazolo-
   (5,4-d)-thiazole,
4,4'-bis(4-hydroxyphenyl)pentanoic acid octadecyl ester,
cyclopenylidene 4,4'-bisphenol,
2-ethylbutadene 4,4'-bisphenol,
4,4'-cyclooctylidenebis(2-cyclohexylphenol),
β,β-thiodiethanolbis(3-tert-butyl-4-hydroxyphenoxy
   acetate,
1,4-butanediolbis(3-tert-butyl-4-hydroxyphenoxy
   acetate),
pentaerythritoltetra(4-hydroxyphenyl propionate),
2,4,4'-trihydroxy benzophenone,
bis(2-tert-butyl-4-hydroxy-5-methylphenyl)sulfide,
bis(2-tert-butyl-4-hydroxy-5-methylphenyl)sulfoxide,
bis(3-methyl-5-tert-butyl-4-hydroxy benzyl)sulfide,
bis(2-hydroxy-4-methyl-6-tert-butyl phenyl)sulfide,
4,4'-bis(4-hydroxyphenyl)pentanoic acid octadecyl thio-
   propionate ester,
1,1,3-tris(2'-methyl-4'-hydroxy-5'-tert-butylphenyl)
   butane,
1,8-bis(2-hydroxy-5-methylbenzoyl)-n-octane,
2,2'-methylene-bis [4'-(3-tert-butyl-4-hydroxyphenyl)-
   thiazole],
1-methyl-3-(3-methyl-5-tert-butyl-4-hydroxybenzyl)
   naphthalene,
2,2'-(2-butene)bis-(4-methoxy-6-tert-butyl phenol).

The following examples are illustrative of the prepara-
tory procedure for the compounds of this invention:

EXAMPLE 1

55 g. of 4,4'-n-butylidene-bis(2-tertiary-butyl-5-methyl phenol), 30 g. of triisooctyl phosphite and 0.48 g. of sodium hydroxide were heated at 120 to 125° C. for three hours, forming a clear brown homogeneous liquid. This was then heated at 140° C. under reduced pressure, and the isooctanol which was distilled off was recovered. The weight of isooctanol recovered showed that the reaction product was di-(4,4'-n-butylidene-bis(2-tertiary-butyl-5-methyl-phenol))isooctyl phosphite. This was then oxidized to the phosphate, by adding 40 g. of the phosphite, diluted with 20 g. of toluene, to one liter of 0.2 N hydrogen peroxide in isopropanol (6.8 g. of 50% aqueous $H_2O_2$ diluted with isopropanol to a volume of 1 liter). The addition required 30 minutes and the temperature of the reaction mixture rose to 32° C. One hour after the end of the addition, 2 g. zinc dust was added to the reaction mixture to destroy any remaining peroxide. The reaction mixture with the zinc was kept overnight, before being decanted, and evaporated to dryness.

EXAMPLE 2

100 g. of 4,4'-benzylidene-bis(2-tertiary-butyl-5-methyl-phenol), 76 g. of cyclohexyl diphenyl phosphite and 0.48 g. of sodium hydroxide were heated at 120 to 125° C. for three hours, forming a clear brown solution. This was then heated at 140° C. under reduced pressure, and the phenol which was distilled off was recovered. The weight of phenol recovered showed that the reaction product was (4,4'-benzylidene-bis-(2-tertiary-butyl - 5-methyl-phenol)) cyclohexyl phenyl phosphite. This was then oxidized to the phosphate in the same manner as the phosphite of Example 1.

EXAMPLE 3

One mole of triphenyl phosphite (310 grams), 0.65 mole of 2,2' - bis( - parahydroxyphenyl)propane (148 grams) and 1.8 mole isooctanol (234 grams) were heated at 110° to 120° C. for three hours, together with 0.5 gram of sodium hydroxide. The reaction mixture was then vacuum stripped at 170° C. at the water pump to remove as much phenol as possible. 273 grams of phenol, 96% of the calculated quantity, was obtained, showing that the reaction product was isooctyl 4,4'-bis(-parahydroxyphenyl)propane phosphite. This was then oxidized to the phosphate as follows. 346 grams (0.5 mole) of the phosphite was diluted with 70 ml. of toluene. This diluted phosphite was then added to a solution made by cautious addition of 75 g. (0.6 mole) 50% hydrogen peroxide to 400 ml. isopropanol; while the solution was being mixed, external cooling was applied to keep the reaction mixture below 45° C. The mixed solutions were allowed to stand for two hours. After being mixed, excess peroxide was removed by adding 75 ml. of saturated sodium bisulfite solution. The phosphate was isolated by evaporation of the organic layer to 110° C. at 15 mm. to remove all volatiles.

EXAMPLE 4

One mole of triphenyl phosphite, 1.0 mole of 4,4'-n-butylidenebis(2-tertiary-butyl - 5-methylphenol), and 2 moles of tridecyl alcohol were reacted in two stages. The triphenyl phosphite was first transesterified with the dihydric phenol in the presence of 0.5 gram of sodium hydroxide, reacting the ingredients at 110 to 120° C. for three hours, and vacuum-stripping the mixture to 170° C. on the water pump. Next, the tridecyl alcohol was added, and the mixture again heated to 110 to 120° C. for three hours, and then vacuum stripped to 170° C. at the water pump. The combined strippings gave 89% of the calculated quantity of phenol at the first stage, and 98% at the second stage. The reaction product was tridecyl 4,4'-n-butylidene-bis(2-tertiary butyl-5-methyl-phenol)phosphite. This was then oxidized to the phosphate, by applying the same procedure as in Example 3.

EXAMPLE 5

1.1 mole of isooctyl diphenylphospite and 0.4 mole of 4,4'-oxobis phenol were heated together in the presence of 0.5 gram of sodium hydroxide at 110 to 120° C. for three hours. The reaction mixture was then vacuum stripped to 170° C. at the water pump, obtaining 53½% of the calculated quantity of phenol. The reaction product was isooctylphenyl 4,4'-oxobisphenol phosphite. This was then oxidized to the phosphate, by adding the reaction product, diluted with 100 ml. benzene, to 300 grams (approx. 1.25 mole) 32% aqueous peracetic acid and 300 ml. 7½% aqueous disodium phosphate solution. After addition, the mixture was stirred 30 minutes at 24–27° C. The organic layer was separated, washed in toluene with two 100 ml. portions of water, 100 ml. of 5% sodium bisulfite, and 100 ml. water, and evaporated to 110° C. at 15 mm. Hg to remove volatiles and yield the phosphate as a pale yellow liquid.

EXAMPLE 6

1.1 moles of triphenyl phosphite, 1.55 moles of 2-ethylhexanol and 0.33 mole of 2,2′-methylene-bis[4-methyl-6-(1′-methylcyclohexyl) phenol] were reacted together in two stages. First, the triphenyl phosphite and 2-ethylhexanol were reacted at 110 to 120° C. for three hours in the presence of 0.5 gram of sodium hydroxide, and this mixture was then vacuum stripped to 170° C. at the water pump. 98% of the calculated quantity of phenol was recovered. Next, the 2,2′ - methylene-bis[-4-methyl - 6-1′ (methylcyclohexyl) phenol] was added, and the reaction mixture again heated at 110 to 120° C. for three hours, and vacuum stripped to 170° C. at the water pump. 83% of the calculated phenol was recovered. The reaction product was 2-ethylhexyl-2,2′ - methylene-bis[4-methyl-6-(1′-methylcyclohexyl) phenol] phosphite. This was then oxidized to the phosphate, by following the procedure of Example 3.

EXAMPLE 7

2 moles of 2,2′-bis-(parahydroxy phenyl)propane and 1 mole of decyl diphenyl phosphite were heated at 110 to 120° C. for three hours, together with 0.5 gram of sodium hydroxide. The reaction mixture was vacuum stripped to 170° C. with a water pump to remove as much phenol as possible. 98% of the calculated quantity of phenol was recovered, showing that the reaction product was di(2,2′-bis(parahydroxy phenyl) propane) decyl phosphite. This was then oxidised to the phosphate, by the method shown in Example 3.

EXAMPLE 8

0.2 mole of octyl diphenyl phosphite was reacted with 0.105 mole of 4,4′-methylene-bis(2-t-butyl-6-methyl phenol) and heated in the presence of 0.5 gram of sodium hydroxide at 110° C. to 120° C. for three hours. The reaction mixture was then vacuum stripped with a water pump to 170° C. until 65% of the phenol was collected. This was then oxidized to the phosphate, by diluting 45 grams of the phosphite with 20 g. toluene and adding this solution to 1 liter of 0.2 N hydrogen peroxide in isopropanol, as shown in Example 1.

EXAMPLE 9

One mole of triphenyl phosphite, 0.5 mole of 4,4′-n-butylidenebis (2-tertiary-butyl-5-methylphenol) and two moles of tridecyl alcohol were reacted in two stages. The triphenyl phosphite was first transesterified with the bisphenol in the presence of 0.5 gram of sodium hydroxide, reacting the ingredients at 110 to 120° C. for three hours, and vacuum stripping the mixture to 170° C. on the water pump. Next, the tridecyl alcohol was added, and the mixture again heated to 110 to 120° C. for three hours, and then vacuum stripped to 170° C. at the water pump. The combined distillate gave 89% of the calculated quantity of phenol at the first stage, and 98% at the second stage. The reaction product was tetra-tridecyl (4,4′-n-butylidene-bis (-2-tertiary-butyl-5-methyl-phenyl)) diphosphite, $D_{25}=0.931$, $n_D^{25}=1.4910$, 4.48% trivalent phosphorus (analyzed according to the method set forth in U.S. Pat. No. 3,056,824). This was then oxidized to the phosphate, by adding a solution of 92.8 g. (0.15 mole) phosphite in 85 ml. trichloroethylene to a stirred mixture of 12.2 g. (0.18 mole) 50% aqueous hydrogen peroxide and 1 g. borax; during the mixing, the temperature was kept from rising above 40° C. The addition required 2½ hours, and the mixture was allowed to stand for an additional 1 hour. The trichloroethylene solution of the product was washed with 40 ml. portions of water and evaporated under reduced pressure to give the phosphate. Trivalent phosphorus analysis was below 0.1%.

EXAMPLE 10

1.1 moles of triisooctyl phosphite and 0.4 mole of 4,4′-methylenebis(-2-tertiary butyl - 5 - methyl-phenol) were heated together in the presence of 0.5 gram of sodium hydroxide at 110 to 120° C. for three hours. The reaction mixture was then vacuum stripped to 170° C. at the water pump, obtaining 93% of the calculated quantity of isooctanol. The reaction product was then distilled in a wiped-film molecular still and separated into a more volatile fraction consisting mostly of tri-isooctyl phosphite, and a less volatile fraction consisting mostly of tetra-isooctyl - 4,4′ - methylenebis-(2-t-butyl - 5 - methylphenyl) di-phosphite. This was then oxidized to the phosphate, by adding 183 g. (approximately 0.2 mole) of the diphosphite to a dilution of 30 g. (0.48 mole) 50% hydrogen peroxide in 200 ml. isopropanol, and then proceeding as in Example 3.

EXAMPLE 11

1.1 moles of triphenyl phosphite, 0.85 mole of 2-ethylhexanol and 1.1 mole of 2,2′-methylene bis-(-4-methyl-6-1′-methyl cyclohexyl phenol) were reacted together in two stages. First, the triphenyl phosphite and 2-ethylhexanol were reacted at 110 to 120° C. for three hours in the presence of 0.5 gram of sodium hydroxide, and this mixture was then vacuum stripped to 170° C. at the water pump. 98% of the calculated quantity of phenol was recovered. Next, the 2,2′-methylene-bis-(4-methyl-6-1′-methylcyclohexyl phenol) was added, and the reaction mixture again heated at 110 to 120° C. for three hours, and vacuum stripped to 170° C. at the water pump. 83% of the calculated phenol was recovered. The reaction product was 2-ethylhexyl 2,2′-methylene-bis(4-methyl-6-1′-methylcyclohexyl phenyl) polyphosphite, having a molecular weight of 1600±160 (ebullioscopic in benzene). This was then oxidized to the phosphate, by diluting the entire reaction product with 250 ml. of ethylbenzene and adding this solution slowly to 450 ml. of a 21% solution of peracetic acid in ethyl acetate. During mixing, the solution was kept at 40° C. maximum by intermittent cooling. To ensure completion of the reaction, the reaction mixture was held at 40° C. for an additional hour after the addition was completed. The phosphate product was isolated by distilling off all volatiles to 130° C. and 11 mm. Hg.

EXAMPLE 12

0.5 mole of triphenyl phosphite, 0.16 mole of 2-ethylhexanol and 0.5 mole of 2,2′-methylene bis-(4-methyl-6-(1′-methyl cyclohexyl) phenol) were reacted together in two stages. First, the triphenyl phosphite and 2-ethylhexanol were reacted at 110 to 120° C. for three hours in the presence of 0.5 gram of sodium hydroxide, and this mixture was then vacuum stripped to 170° C. at the water pump. 98% of the calculated quantity of phenol was recovered. Next, the 2,2′-methylene bis-(-4-methyl-6-(1′-methyl cyclohexyl) phenol) was added, and the reaction mixture again heated at 110 to 120° C. for three hours, and vacuum stripped to 170° C. at the water pump. 83% of the calculated phenol was recovered. The reaction product was phenyl-2-ethylhexyl-2,2′-methylene-bis-(4-methyl-6-1′-methylcyclohexyl phenyl) polyphosphite, containing one 2-ethylhexyl group for every three phosphite groups and having a molecular weight of 1600±160 (ebullioscopic in benzene). This was then oxidized to the phosphate, by the method of Example 11.

EXAMPLE 13

Triphenyl phosphite (103 g., 0.33 mole) was transesterified with isooctanol (2 hours at 110–120°) and with 4,4′-isopropylidenebisphenol (3 hours at 120–140°), various proportions of reagents being used, as noted in Table A below. At the end of the reaction, the mixtures of isooctyl 4,4′-isopropylidenebisphenyl polyphosphites were vacuum-distilled to 150° C. to remove phenol and isooctanol (if any). All reaction products were liquid. Proportions and properties are given in Table A.

TABLE A

| Composition: | Weight (grams) | | | |
|---|---|---|---|---|
| | A | B | C | D |
| Triphenyl phosphite | 103 | 103 | 103 | 103 |
| Isooctanol | 56 | 65 | 73 | 78 |
| 4,4'-isopropylidene bisphenol | 64.5 | 57 | 53 | 45.5 |
| Sodium | 0.1 | 0.1 | 0.1 | 0.1 |
| Product: | | | | |
| Phenol distilled | 87 | 86 | 87 | 88 |
| Isooctanol distilled | None | None | 1.2 | 3.4 |
| Density 25° C | 1.027 | 1.038 | 1.023 | 1.011 |
| $n_D^{25}$ | 1.5445 | 1.5331 | 1.5233 | 1.5133 |

Each of these products was then oxidized to the phosphate, by adding each phosphite product to stirred mixtures of 25 g. of 50% hydrogen peroxide (approximately 10% excess) and 1.5 g. borax, kept at 35–40° C. The relatively viscous phosphite A was first diluted with 20 ml. of toluene. The others were used neat. The phosphates were isolated and purified in the manner described in Example 9.

EXAMPLE 14

Hexa - tridecyl butane-1,1,3,-tris (2'-methyl-5'-t-butylphenyl-4'-) triphosphite was prepared from 91.7 g. (0.167 mole) 1,1,3-tris (2'-methyl-4'-hydroxy-5'-t-butylphenyl) butane, 155 g. (0.5 mole) triphenyl phosphite, 200 g. (1 mole) tridecyl alcohol (a commercial mixture of branched-chain, primary thirteen carbon alcohols), and 1 g. anhydrous potassium carbonate. The triphenyl phosphite was transesterified with the trihydric phenol, vacuum stripped, the alcohol added, and the mixture heated and stripped again. The stripping gave 89% of the calculated quantity of phenol at the first stage and 98% at the second stage. The product analyzed 4.35% trivalent phosphorus, $D_{25}=0.940$, $n_D^{25}=1.4945$. This was then oxidized to the phosphate, by adding, over a 2½ hour period, a solution of 105 g. (0.15 mole) of the phosphite in 90 ml. trichloroethylene to a stirred mixture of 12.2 g. (0.18 mole) 50% hydrogen peroxide and 1 g. borax. During the addition, the mixture was kept at 35–40° C. The solution of the product was washed with several portions of water, stirred one hour with 2 g. zinc dust to remove residual peroxide, and evaporated to 110° C. and 15 mm. Hg. to yield the phosphate. Trivalent phosphorus content was below 0.1%.

EXAMPLE 15

2,6-bis (2'-hydroxy-3',5-dinonylbenzyl) - 4 - nonylphenol was prepared from 5 moles nonyl phenol, 10 moles dinonyl phenol, 10 moles paraformaldehyde, and 8.3 g. (0.17%) oxalic acid catalyst. The reactants and catalysts were dissolved in toluene and refluxed for 24 hours. The catalyst was neutralized with sodium carbonate, the toluene removed, and the trisphenol so obtained used directly in the preparation of the phosphite.

One mole (936 g.) of the trisphenol, 1.1 mole isooctyl diphenyl phosphite, and 1.2 g. sodium hydroxide were heated at 3 hours at 110–120° C. and stripped to 150° C. Phenol was stripped amounting to 93% of the calculated quantity. The product was isooctyl-[2,6-bis(2'-hydroxy-3',5-dinonylbenzyl)-4-nonylphenyl] polyphosphite, $$D_{25}=0.961, n_D^{25}=1.4952$$

This was then oxidized to the phosphate by following the procedure of Example 14. The phosphite was diluted with 400 ml. of trichloroethylene and added over a four hour period to 90 ml. 50% hydrogen peroxide (20% excess) and 5 g. borax while keeping the temperature from rising above 50° C. The separation of the phosphate followed the method of Example 14.

EXAMPLE 16

Tetra-tridecyl 4,4'-isopropylidenebisphenyl diphosphite, $D_{25}=0.953$, $n_D^{25}=1.4853$, was prepared from 0.5 mole 4,4'-isopropylidene bis(phenol), 1 mole triphenyl phosphite, 2 moles tridecyl alcohol, and sodium metal as catalyst in a single transesterification step. Phenol stripped was 89% of the calculated quantity. This was then oxidized to the phosphate, by the isopropanol solution technique of Example 3. The phosphite was added slowly to 75 g. of 50% hydrogen peroxide (10% excess) previously diluted with 400 ml. of isopropanol; during the addition, the temperature was kept from going above 50° C. As in Example 3, sodium bisulfite was used to destroy unreacted peroxide prior to distillation of volatiles to 110° C. at 15 mm. Hg. The phosphate product was an extremely pale yellow oil.

EXAMPLE 17

Tetratridecyl-4,4'-oxydiphenyl diphosphite, $D_{25}=0.932$, $n_D^{25}=1.4830$, was similarly prepared from 62 g. triphenyl phosphite, 20.4 g. 4,4'-oxybisphenol, and 80 grams tridecyl alcohol. Phenol stripped was 88.7% of the theoretical quantity. This was then oxidized to the phosphate, by adding the phosphite to one liter of 0.42 N hydrogen peroxide in isopropanol (28.6 g. 50% hydrogen peroxide diluted to one liter with isopropanol), and proceeding as in Example 1).

EXAMPLE 18

Tetra-n-dodecyl 4,4'-n-butylidenebis-(2-t-butyl-5-methylphenyl) diphosphite was similarly prepared from 1550 g. triphenyl phosphite, 950 g. 4,4'-butylidenebis-(2-t-butyl-5-methylphenol), 1860 g. n-dodecanol, and 4 g. sodium hydroxide. Phenol stripped was 90.4% of the calculated quantity and the product analyzed 4.24% trivalent phosphorus. This was then oxidized to the phosphate, by adding a 171.1 g. portion (approximately 0.1 mole) to 1.05 liters 0.2 N hydrogen peroxide in isopropanol, and proceeding as in Example 1. The phosphate obtained had a trivalent phosphorus content below 0.1%.

EXAMPLE 19

Di(4,4'-n-butylidenebis - (2 - t-butyl-5-methyl phenol)), tri-n-dodecyl diphosphite, $D_{25}=0.967$, $n_D^{25}=1.4985$, was prepared from 2 moles of triphenyl phosphite, 3 moles of n-dodecyl alcohol, 2 moles of 4,4'-n-butylidenebis-(2-t-butyl-5-methylphenol) and 4 grams sodium hydroxide. The reactants were heated and mixed at 120 to 130° C. for approximately 5 hours, and then vacuum stripped to 150° C. to remove phenol. This was then oxidized to the phosphate, by treating the entire reaction product in the manner of Example 14. The product was diluted with with 300 ml. of trichloroethylene, and then added to a mixture of 150 g. 50% hydrogen peroxide (10% excess) and 6 g. borax during 4 hours. The temperature was maintained at 37–46° C. during addition. Two hours after the end of the addition, the reaction mixture was quenched in 2 liters of cold water. The layers were separated, and the organic layer stirred 20 minutes with 30 g. zinc dust. The mixture was filtered, and evaporated to yield the phosphate product, a viscous yellow oil having a trivalent phosphorus value below 0.1%.

EXAMPLE 20

Tetrahydrofurfuryl alcohol, 54 grams (0.5 mole) was mixed with 159 grams (0.5 mole) butyldicresyl phosphite and 0.5 gram sodium hydroxide and heated for 3 hours at 110° C. The reaction product was then vacuum distilled under a water pump to 170° C. and the cresol removed was 90% of the calculated quantity. The product was further reacted with 57 grams (0.25 mole) 4,4'-isopropylidene bisphenol for 5 hours at 120° C. The reaction product was vacuum distilled under a water pump to 190° C. The product analyzed 7.6% trivalent phosphorus. This was then oxidized to the phosphate, by adding the phosphite to a stirred mixture of 75 g. 50% hydrogen peroxide, and 5 g. borax with the temperature kept at 40–45° C. The phosphate was isolated from the reaction mixture by the technique shown in Example 9.

EXAMPLE 21

Butoxyethanol, 59 grams (0.5 mole) was reacted with 100 grams (0.322 mole) triphenyl phosphite at 120° C. for 3 hours, and then vacuum stripped. The product was then reacted with 85 grams (0.2 mole) of 2,2'-methylene-bis-(4-methyl-6-1'-methylcyclohexyl phenol) for 3 hours at 120° C. The mixture was then stripped under a water pump to 150° C. 91% of the calculated quantity of phenol was recovered and the material was a diphosphite. This was then oxidized to the phosphate, by the aqueous hydrogen peroxide method shown in Example 13. No diluent was used for the phosphite.

EXAMPLE 22

Cyclooctanol 128 grams (1 mole) was transesterified with 234 grams (1 mole) diphenyl phosphite and 90 grams of phenol was distilled off. The product was reacted with 114 grams (0.5 mole) 4,4'-isopropylidene bisphenol and 92% of the calculated quantity of phenol was recovered was recovered. The product was isopropylidene bisphenyl dicyclooctyl diacid phosphite. This was then oxidized to the acid phosphate, by preheating the phosphite to 60° C. in a constant temperature bath, adding 400 g. of a 21% solution of peracetic acid in ethyl acetate over a 3 hour period, and keeping the resulting solution in the 60 C. bath for an additional 2 hours. The acid phosphate was isolated by removing ethyl acetate, acetic acid, and unreacted peracetic acid by distilling to 110° C. and 15 mm. Hg.

EXAMPLE 23

100 grams of the tridecyl 4,4'-butylidene bis-(-2-tert-butyl-5-methyl phenyl) phosphite of Example 4 plus 7 grams phosphorous acid were warmed at 80° C. for 1 hour forming the butylidene bis-(-2-tert-butyl-5-methyl phenyl) tridecyl acid phosphite. This was then oxidized to the acid phosphate by the action of 75 g. of 21% peracetic acid in ethyl acetate, as shown in Example 22.

EXAMPLES 24 THROUGH 27

Various mixed aliphatic-aromatic polyphosphites were formed by transesterifying tricresyl phosphite and a mixture of tricresyl phosphite and octyl dicresyl phosphite with 4,4'-isopropylidene bisphenol in the proportions set forth in the table below. The transesterification was carried out for 3 hours at 130° C. At the end of the reaction, the reaction mixture was vacuum distilled to 190° C. to remove 90% of the calculated quantity of the cresol formed during the transesterification reaction. All of the reaction products were viscous liquids, Example 24 being most viscous and the others decreasing in order.

|  | Moles | | | |
| --- | --- | --- | --- | --- |
| Examples | 24 | 25 | 26 | 27 |
| Reactants: | | | | |
| Tricresyl phosphite | 4 | 3 | 2 | 1 |
| 2-ethylhexyl dicresyl phosphite | 1 | 1 | 1 | 1 |
| 4,4'-isopropylidene bisphenol (bisphenol A) | 4 | 3 | 2 | 1 |
| Product | (¹) | (²) | (³) | (⁴) |
| Trivalent phosphorus, percent P | 8.8 | 8.6 | 8.5 | 8.5 |

¹ Pentamer. ² Tetramer. ³ Trimer. ⁴ Dimer.

Each of these was then oxidized to the phosphate, and the product separated by following the method of Example 3, using in each instance a quantity of phosphite corresponding to 0.5 mole trivalent phosphorus. The weights of phosphite used and the condition of the phosphate obtained were as shown:

|  | Examples | | | |
| --- | --- | --- | --- | --- |
|  | 24 | 25 | 26 | 27 |
| Weight of phosphite (0.5 mole P³⁺) | 88 g. | 192 g. | 195 g. | 195 g. |
| Appearance | Brittle solid. | Very viscous liquid. | Viscous liquid. | Viscous liquid. |

EXAMPLES 28 THROUGH 30

0.2 mole of octyl diphenyl phosphite was mixed with 0.105 mole of the bicyclic phenol shown in the table below and heated in the presence of 0.5 gram of sodium hydroxide at 110° C. to 120° C. for 3 hours. The reaction mixture was then vacuum stripped to 170° C. with a water pump, obtaining the percentage of the calculated quantity of phenol set forth in the table below. The product was a bisphenyl octyl phenyl diphosphite.

| Example | Polycyclic phenol reactant | Percent (calculated) of phenol distillate | Trivalent P, percent |
| --- | --- | --- | --- |
| 28 | Oxo-diphenol | 95 | 7.9 |
| 29 | 4,4'-isopropylidene bisphenol | 99.8 | 8.3 |
| 30 | 4,4'-cyclohexylidene bisphenol | 90 | 6.7 |

Each of these was then oxidized to the phosphate by diluting the phosphite with 30 cc. ethyl acetate and adding the solution to a stirred mixture of 17 g. 50% aqueous hydrogen peroxide (0.25 mole) and 3 g. disodium phosphate, while keeping the reaction mixture at 30–35° C. Stirring was continued for 30 minutes after the end of the addition. The layers were separated. The organic layer was mixed with 5 g. zinc dust and kept overnight. The liquid was decanted and evaporated from the zinc dust to give the phosphate in better than 95% yield.

EXAMPLE 31

Dibutyl monophenyl phosphite (2.2 moles=594 grams), 4,4'-butylidenebis(2-t-butyl-5-methyl phenol) (1 mole=382 grams), and potassium phenolate catalyst, 5 grams, were heated three hours at 120–130° C. The mixture was then stripped through a wiped-film still, to remove phenol and unreacted dibutyl monophenyl phosphite. The total distillate was 236 grams. The product was

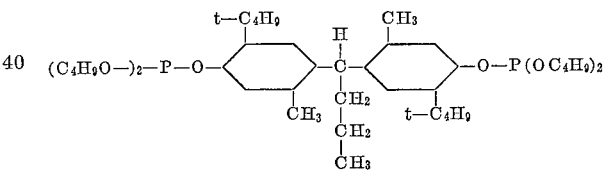

This was then oxidized to the phosphate, by adding 148 grams (0.2 mole) of the phosphite diluted with 30 cc. hexane to a stirred mixture of 31.6 g. (0.45 mole) 50% aqueous hydrogen peroxide and 3.2 g. sodium carbonate. The mixture was kept at 30–40° C. by intermittent cooling of the reaction flask in a pan of ice water. The addition required 1½ hours. Stirring was continued for a further 1½ hours, and the reaction mixture was quenched by the addition of 300 cc. water and 150 cc. hexanol. The layers were separated, the organic layer was washed successively with water, 5% aqueous sodium bisulfite, and water, dried over anhydrous magnesium sulfate, and evaporated. The resulting phosphate product was a pale yellow, moderately viscous oil.

EXAMPLE 32

1 mole (310 g.) of triphenyl phosphite and 1.1 moles (143 g.) of isooctanol were mixed with 0.56 mole (200 g.) of 4,4'-thiobis-(2-t-butyl-5-methyl phenol), and heated at 112° C. for three hours in the presence of 4 grams of a 50% sodium phenolate catalyst. The reaction mixture was then vacuum stripped under approximately 15 mm. Hg pressure with a water pump to a pot temperature of 135° C. 141.5 g. of distillate, which solidified at 39.4° C., was obtained of which 138.4 g., 97.8% was phenol, which represented 1.47 moles of phenol per mole of triphenyl phosphite reactant. 506.6 g. of product was obtained, having a refractive index $n_D^{25}$ 1.5425, trivalent phosphorus, 4.6%.

The phosphite reaction product was then oxidized to the corresponding phosphate by the process described in U.S. Pat. No. 3,056,824. 0.4 mole (20 g.) of the phosphite was added to 1 l. of 0.2 N hydrogen peroxide in isopropanol (5.5 ml. of 50% hydrogen peroxide diluted to 1 liter with isopropanol). After swirling to dissolve the sample, the reaction container was stoppered and left for thirty minutes at room temperature. Glacial acetic acid (400 ml.) was then added, followed immediately by 800 ml. of 40% aqueous potassium iodide solution. After standing for about 5 minutes at room temperature, 120 ml. of 0.1 N sodium thiosulfate solution was added to eliminate the iodine formed. The mixture was allowed to stand until the iodine color had completely disappeared.

The phosphate thus formed was extracted from the reaction mixture with benzene; the benzene extract was washed with water, and then evaporated under reduced pressure until dry.

EXAMPLE 33

0.25 mole triphenyl phosphite (77.5 g.), 0.275 mole isooctanol (35.8 g.), 0.131 mole 4,4'-butylidene-bis(2-t-butyl-5-methyl-phenol) (50 g.) were mixed and heated in the presence of 1 gram of sodium phenolate (50%) catalyst for three hours at 112° C. At the end of this time, a solid material was noted in the reaction container. An additional 0.161 mole (50 g.) triphenyl phosphite and 0.183 mole (23.8 g.) isooctanol was added, and the reaction mixture was heated for an additional three hours before being stripped as in Example 32. 62 g. of a distillate, solidification temperature 35.2° C., containing 93.9% or 58.2 g. of phenol were obtained, representing 1.51 moles of phenol per mole of phosphite. 190 g. of product was obtained, having a refractive index $n_D^{25}$ of 1.5274, 6.2% trivalent phosphorus. This phosphite product was then oxidized to the corresponding phosphate as in Example 32.

In accordance with the invention, there are also provided synthetic resin compositions having an improved resistance to deterioration containing one or more of the organic phosphates as defined above. The organic phosphates of the invention are effective stabilizers for olefin polymers such as polyethylene, polypropylene, polybutylene, and higher polyolefins.

Olefin polymers on heating and working in air undergo degradation, resulting in a loss in melt viscosity. This problem is particularly serious with polypropylene. The organic phosphates of the invention are effective in overcoming this reduction in melt viscosity.

The stabilizer of the invention is applicable to olefin polymers prepared by any of the various procedures, using the available catalysts, such as Ziegler, ICI, Union Carbide, Du Pont, Phillips, Montecatini, Esso and Standard Oil (Indiana) process polymers (Chem. & Eng. News, Nov. 21, 1960, pp. 36–59), for the molecular weight and tacticity are not factors affecting this stabilizer.

Polypropylene solid polymer can be defined in a manner to differentiate it from other polyolefins as having a density within the range of from 0.86 to 0.91, and a melting point above 150° C. The stabilizer of the invention is applicable to all such polypropylenes as distinguished from polypropylenes in the liquid form or in semiliquid or gel-like forms such as are used as greases and waxes.

Isotactic polypropylene, available commercially under the trade names Pro-Fax, Escon and Olefane and having a softening or hot-working temperature of about 350° F., is an example of a sterically regular polypropylene polymer.

Mixtures of olefin polymers, such as propylene polymers with other compatible olefin polymers, and copolymers of propylene with copolymerizable monomers such as ethylene and butene, also can be stabilized in accordance with this invention. For example, mixtures of polyethylene and polypropylene, and copolymers of propylene and ethylene which contain a sufficient amount of propylene to present the instability problem that is resolved by the stabilizer of the invention, can be stabilized by the addition of phosphate, alone or in combination with other propylene polymer stabilizers.

The stabilizers of the invention can also be used with low density polyethylene, Ziegler polyethylene, high density polyethylene, poly(butene-1), poly(pentene-1), poly-(3-methylbutene-1), poly-4-methyl-pentene-1, and polystyrene.

The phosphate is incorporated with the olefin polymer alone or in conjunction with other olefin polymer stabilizers.

Additional heat stabilizers which can be used include, for instance, thiodipropionic esters, polyvalent metal salts of organic acids, organic mercaptans, and organic polysulfides.

When the phosphate stabilizer is used in conjunction with a thiodipropionic acid ester, the improvement is evidenced by a materially prolonged resistance to embrittlement and development of tackiness at elevated temperatures. The thiodipropionic acid ester has the following formula:

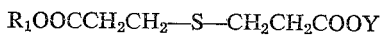

in which $R_1$ is an organic R radical selected from the group consisting of hydrocarbon radicals such as alkyl, alkenyl, aryl, cycloalkyl, mixed alkyl aryl, and mixed alkyl cycloalkyl radicals; and esters thereof with aliphatic carboxylic acids; and Y is selected from the group consisting of (a) hydrogen, (b) a second R radical $R_2$, which can be the same as or different from the $R_1$ radical, (c) a polymeric chain of $n$ thiodipropionic acid ester units:

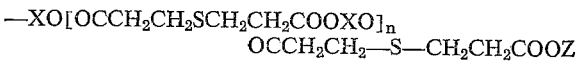

where Z is hydrogen, $R_2$ or M; $n$ is the number of thiodipropionic acid ester units in the chain; and X is a bivalent hydrocarbon group of the type of $R_1$, that is, alkylene, alkenylene, arylene, cycloalkylene, mixed alkyl arylene and mixed alkyl cycloalkylene radicals; the value of $n$ can range upwards from 1, but there is no upper limit on $n$ except as is governed by the ratio of carbon atoms to sulfur atoms as stated below; and (d) a polyvalent metal M of Group II of the Periodic Table such as zinc, calcium, cadmium, barium, magnesium and strontium.

The molecular weights of the R and Y radicals are taken such that with the remainder of the molecule the thiodipropionic ester has a total of from about ten to about sixty carbon atoms per sulfur atom.

Accordingly, the various thiodipropionic acid ester species coming within the above-mentioned categories within the general formula can be defined as follows:

(a)    $R_1OOCCH_2CH_2SCH_2CH_2COOH$
(b)    $R_1OOCCH_2CH_2SCH_2CH_2COOR_2$
(c)    $R_1O[OCCH_2CH_2SCH_2CH_2COOX-O]_n$
       $OCCH_2CH_2SCH_2CH_2COOZ$
(d)    $[R_1OOCCH_2CH_2SCH_2CH_2COO]_2M$

In the above formulae $R_1$ and $R_2$ M, X and Z are the same as before. In the polymer (c), as in the other forms of thiodipropionic acid esters, the total number of carbon atoms per sulfur atom is within the range from about ten to about sixty.

The R radical of these esters is important in furnishing compatability with the polypropylene. The Y radical is desirably a different radical, $R_2$ or M or a polymer, where R is rather low in molecular weight, so as to compensate for this in obtaining the optimum compatibility and nonvolatility. Where Y is a metal, the thiodipropionic acid ester furnishes the beneficial properties of the polyvalent metal salt which is described below.

The aryl, alkyl, alkenyl and cycloalkyl groups may, if desired, contain inert, nonreactive substituents such as halogen and other carbocyclic and heterocyclic ring structures condensed therewith.

Typical R radicals are, for example, methyl, ethyl, propyl, isopropyl, butyl, isobutyl, t-butyl, amyl, isoamyl, n-octyl, isooctyl, 2-ethyl hexyl, t-octyl, decyl, dodecyl, octadecyl, allyl, hexenyl, linoleyl, ricinolelyl, oleyl, phenyl, xylyl, tolyl, ethylphenyl, naphthyl, cyclohexyl, benzyl, cyclopentyl, methylcyclohexyl, ethylcyclohexyl, and naphthenyl, hydroxyethyl, hydroxypropyl, glycerol, sorbityl, pentaerythrityl, and polyoxyalkylene radicals such as those derived from diethylene glycol, triethylene glycol polyoxypropylene glycol, polyoxyethylene glycol, and polyoxypropyleneoxyethylene glycol, and esters thereof with any of the organic acids named below in the discussion of the polyvalent metal salts, including in addition those organic acids having from two to five carbon atoms, such as acetic, propionic, butyric and valeric acids.

Typical X radicals are alkylene radicals such as ethylene, tetramethylene, hexamethylene, decamethylene, alkyl- and aryl-substituted alkylene radicals such as 1,2-propylene,

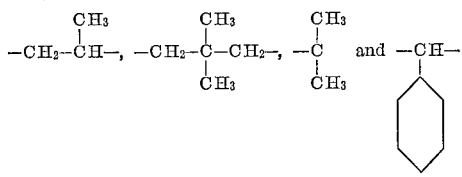

arylene radicals such as phenylene,

methylenephenylene,

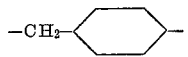

dimethylene phenylene,

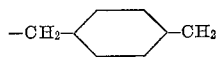

and alicyclene radicals such as cyclohexylene,

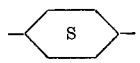

and cyclopentylene

As exemplary of the thiodipropionic acid esters which can be used, there can be mentioned the following: monolauryl thiodipropionic acid, dilauryl thiodipropionate, butyl stearyl thiodipropionate, di(2-ethylhexyl)-thiodipropionate, diisodecyl-thiodipropionate, isodecyl phenyl thiodipropionate, benzyl lauryl thiodipropionate, benzyl phenyl thiodipropionate, the diester of mixed coconut fatty alcohols and thiodipropionic acid, the diester of mixed tallow fatty alcohols and thiodipropionic acid, the acid ester of mixed cottonseed oil fatty alcohols and thiodipropionic acid, the acid ester of mixed soybean oil fatty alcohols and thiodipropionic acid, cyclohexyl nonyl thiodipropionate, monooleyl thiodipropionic acid, hydroxyethyl lauryl thiodipropionate, monoglyceryl thiodipropionic acid, glyceryl monostearate monothiodipropionate, sorbityl isodecyl thiodipropionate, the polyester of diethylene glycol and thiodipropionic acid, the polyester of triethylene glycol and thiodipropionic acid, the polyester of hexamethylene glycol and thiodipropionic acid, the polyester of pentaerythritol and thiodipropionic acid, the polyester of octamethylene glycol and thiodipropionic acid, the polyester of p-dibenzyl alcohol and thiodipropionic acid, ethylbenzyl lauryl thiodipropionate, strontium stearyl thiodipropionate, magnesium oleyl thiodipropionate, calcium dodecylbenzyl thiodipropionate, and mono(dodecylbenzyl) thiodipropionic acid.

These esters are for the most part known compounds, but where they are not available, they are readily prepared by esterification of thiodipropionic acid and the corresponding alcohol.

When the phosphate is used in conjunction with a polyvalent metal salt of an organic acid, the polyvalent metal salt of an organic acid will ordinarily have from about six to about twenty-four carbon atoms. The polyvalent metal can be any metal of Group II of the Periodic Table, such as zinc, calcium, cadmium, barium, magnesium and strontium. The alkali metal salts and heavy metal salts such as lead salts are unsatisfactory. The acid can be any organic non-nitrogenous monocarboxylic acid having from six to twenty-four carbon atoms. The aliphatic, aromatic alicyclic and oxygen-containing heterocyclic organic acids are operable as a class. By the term "aliphatic acid" is meant any open chain carboxylic acid, substituted, if desired, with nonreactive groups, such as halogen, sulfur and hydroxyl. By the term "alicyclic" it will be understood that there is intended any cyclic acid in which the ring is nonaromatic and composed solely of carbon atoms, and such acids may if desired have inert, nonreactive substituents such as halogen, hydroxyl, alkyl radicals, alkenyl radicals and other carbocyclic ring structures condensed therewith. The oxygen-containing heterocyclic compounds can be aromatic or nonaromatic and can include oxygen and carbon in the ring structure, such as alkyl-substituted furoic acid. The aromatic acids likewise can have nonreactive ring substituents such as halogen, alkyl and alkenyl groups, and other saturated or aromatic rings condensed therewith.

As exemplary of the acids which can be used in the form of their metal salts there can be mentioned the following: hexoic acid, 2-ethylhexoic acid, n-octoic acid, isooctoic acid, capric acid, undecylic acid, lauric acid, myristic acid, palmitic acid, margaric acid, stearic acid, oleic acid, ricinoleic acid, behenic acid, chlorocaproic acid, hydroxy capric acid, benzoic acid, phenylacetic acid, butyl benzoic acid, ethyl benzoic acid, propyl benzoic acid, hexyl benzoic acid, salicylic acid, naphthoic acid, 1-naphthalene acetic acid, orthobenzoyl benzoic acid, naphthenic acids derived from petroleum, abietic acid, dihydroabietic acid, hexahydrobenzoic acid, and methyl furoic acid.

The water-insoluble salts are preferred, because they are not leached out when the plastic is in contact with water. Where these salts are not known, they are made by the usual types of reaction, such as by mixing the acid, acid chloride or anhydride with the corresponding oxide or hydroxide of the metal in a liquid solvent, and heating, if necessary, until salt formation is complete.

A very small amount of phosphate is sufficient, with or without additional stabilizers, to improve the stability against deterioration in physical properties, including, for example, resistance to embrittlement, upon exposure to light under the conditions to which the olefin polymer will be subjected. Amounts within the range from about 0.005 to about 5% by weight of the polymer impart satisfactory resistance. Preferably, from 0.01 to 1% is employed for optimum stabilization.

If additional stabilizers are employed to obtain additional stabilization effects, the amount of total stabilizer is within the range from 0.005 to about 5%, preferably from 0.1 to 3%.

Preferably, the stabilizer system comprises from about 0.01 to about 1% of phosphate, from about 0.05 to about 1% of thiodipropionic acid ester, with, optionally, from about 0.25 to about 0.75% of a polyvalent metal salt, when present, and from about 0.05 to about 0.5% of a 2-hydroxy-benzophenone, when present.

If a combination of stabilizers is to be utilized, they may be formulated as a simple mixture for incorporation in the polymer by the polymer manufacturer or by the converter. An inert organic solvent can be used to facilitate handling, if the ingredients do not form a homogeneous mixture or solution.

As indicated, stabilizer compositions containing a phosphate and a 2-hydroxy benzophenone or derivative thereof are preferred for light stabilization. A benzophenone is effective that has a 2-hydroxy-benzophenone nucleus, i.e., a nucleus of the structure

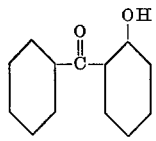

This nucleus is inclusive of the compound 2-hydroxy benzophenone, and derivatives thereof bearing substituent groups attached to any of the ring carbon atoms of the nucleus.

The preferred benzophenones of this invention, containing a nucleus of the above structure, have the following formula:

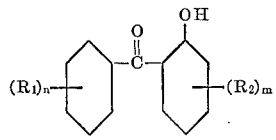

wherein $n$ is an integer from 1 to 5 and $m$ is an integer from 1 to 4 and the R radicals are selected from the group consisting of hydroxyl, halogen (such as fluorine, chlorine, bromine and iodine, and preferably chlorine or bromine) and organic radicals are selected from the group consisting of aliphatic, alicyclic, and heterocyclic groups of from one to thirty carbon atoms.

Also useful are the 2,4,6-derivatives of 1,3,5-trithiane containing hydroxyl groups having a phenolic character

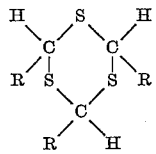

R may represent, for example:

(1) HO—⟨phenyl⟩— 4-hydroxy-phenyl (2) ⟨phenyl⟩— 2-hydroxy-phenyl
    OH (3) Cl—⟨phenyl⟩— 2,4,6-trichloro-3-hydroxy-phenyl
    with Cl, OH, Cl substituents (4) HO—⟨phenyl⟩— 4-hydroxy-3-methoxyphenyl
    OCH₃

(5) HO—⟨phenyl⟩— 4-hydroxy-3-ethoxyphenyl
    OC₂H₅

(6) CH₃
    ⟨phenyl⟩— 6-hydroxy-3-methyl-phenyl
    OH (7) 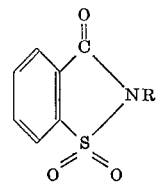 2-hydroxy-5-chlorophenyl The o-hydroxy-phenylbenzotriazoles also can be used. These have the formula:

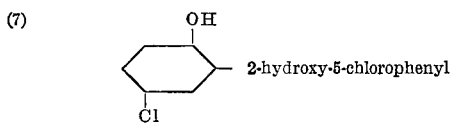

wherein R and R' are selected from the group consisting of hydrogen, hydrocarbon and oxyhydrocarbon radicals.

In the formula, the permissible R and R' substituents are numerous and varied. R and R', as stated, may each be hydrogen, in which case the compound is o-hydroxy-phenylbenzotriazole, or each may be a hydrocarbon or oxyhydrocarbon radical. Typical hydrocarbon radicals that the R and R' substituents can comprise are alkyl, aryl, cycloalkyl, aralkyl and alkaryl radicals such as methyl, ethyl, propyl, n-butyl, decyl, octadecyl, phenyl, cyclohexyl, benzyl, tolyl and similar radicals. Typical oxyhydrocarbon radicals are methoxy, ethoxy, propoxy, isopropoxy and the like.

Exemplary are: 2-(2-hydroxy-5-methylphenyl) benzotriazole, 5,6 - dichloro-2-(2-hydroxy - 5 - tertiary-butyl-phenyl) benzotriazole, 5-methyl - 2 - (2-hydroxy-3,5-dichlorophenyl) benzotriazole.

The 1-dioxides of α,β-benzoisothiazolone or saccharine can also be used:

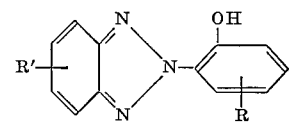

where R is hydrogen or an alkyl, aryl or alkaryl group of from one to twelve carbon atoms, such as 2-methyl saccharine, 2-ethyl saccharine, 2-dodecyl saccharine, and 2-phenyl saccharine.

The alkyl styryl ketones also are satisfactory. These have the formula:

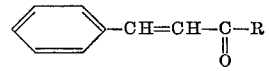

where R is an alkyl or aryl radical having from one to eight carbon atoms, such as benzalacetone, ethyl styryl ketone, and 2,4-dihydroxyphenyl styryl ketone.

The 2-hydroxy aryl-1,3,5-triazines are useful. These have the formula:

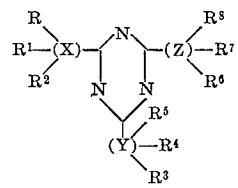

in which X, Y and Z are each an aromatic radical, each containing up to three nuclei of six carbon atoms, for example, phenyl, naphthyl or biphenyl, X being substituted by an hydroxy group ortho with respect to the point of attachment to the triazine nucleus, R, R¹, R², R³, R⁴, R⁵, R⁶, R⁷ and R⁸ are hydrogen, hydroxyl (preferably in the 2-, 4- and/or 5-position of the aromatic nucleus) alkyl (for example, methyl, tertiary-butyl, cyclohexyl, tertiary-octyl, n-octyl and dedecyl), alkoxy (for example, methoxy, n-butoxy, 2-ethylhexyloxy or n-octyloxy, sulfonic or carboxylic acid groups), halogen (for example, iodine, chlorine or bromine), haloalkyl (for example, dichloromethyl or trifluoromethyl), alkylamido (for example, acetamido), monocyclic arylamide (for example, benzamide and lower monocyclic aryl lower alkyl amides, such as phenylacetamido). Exemplary are:

2,4,6-tris-(2-hydroxy-4-octyloxyphenyl)-triazine-s;
2,4,6-tris-(2,4-dihydroxyphenyl)-triazine-s;
2,4,6-tris-(2-hydroxy-4-propylphenyl)-triazine-s;
2,4,6-tris-(2-hydroxy-5-methylphenyl)-triazine-s;
2,4-bis-(2,4-dichlorophenyl)-6-(o-methoxyphenyl)-triazine-2;
2,4-bis-(2,4-dihydroxyphenyl)-6-(o-hydroxyphenyl)-triazine-s;
2-(2,4-dimethylphenyl)-4-(2,4-dihydroxyphenyl)-6-(o-hydroxyphenyl)-triazine-s;
2,4,6-tris-(2-hydroxynaphthyl-1)-triazine-s;
2,4,6-tris-(o-hydroxyphenyl)-triazine-s;
2,4-(2-hydroxy-5-carboxyphenyl)-6-(o-hydroxyphenyl)-triazine-s;
2,4,6-tris-(2-hydroxy-5-chloro)triazine-s;
2,4,6-tris-(2,4-dihydroxy-6-hexylphenyl)-triazine-s;
2-(2,4-dihydroxyphenyl)-4,6-diphenyl-triazine-s;
2-(o-hydroxyphenyl)-4,6-bis(4-methoxyphenyl)-triazine-s;
2,4,6-tris(2,4-dimethoxyphenyl)-triazine-s, and 2,4-bis-(2-hydroxy-4-methoxyphenyl)-6-(2,4-dimethoxyphenyl)-triazine-s;
2,4-bis(2,4-dihydroxyphenyl)-6-(4-methoxyphenyl)-triazine-s.

The alkylhydroxybenzoic acids and their salts and esters are useful. These have the formula:

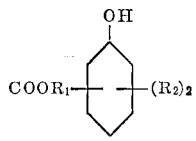

in which $R_1$ is hydrogen, a metal, or an aryl, alkyl, or alkaryl radical, having from one to eighteen carbon atoms, and each $R_2$ is an alkyl, aralkyl, or cycloalkyl radical and at least one $R_2$ radical has a branched chain at an α-carbon atom, as for example in a secondary or tertiary alkyl radical. Preferably, each R has three to eight carbon atoms. Exemplary are:

3-methyl-5-isopropyl-4-hydroxybenzoic acid;
3-ethyl-5-tertiary-butyl-4-hydroxybenzoic acid;
3-pentyl-5-tertiary-octyl-4-hydroxybenzoic acid;
zinc 3,5-diisopropyl salicylate; magnesium didecyl salicylate;
t-butylphenyl-3,5-di-sec-butyl-hydroxybenzoate and 3,5-di-isopropyl-4-hydroxybenzylene 3,5-diisopropyl-4-hydroxybenzoate, 3,5-diisopropyl-4-hydroxybenzoic acid;
3-isopropyl-5-tertiary-butyl-4-hydroxybenzoic acid;
3,5-di-tertiary-butyl-4-hydroxybenzoic acid;
3-cyclohexyl-5-tertiary-butyl-4-hydroxybenzoic acid;
3,5-dicyclohexyl-5-tertiary-butyl-4-hydroxybenzoic acid;
3,5-dicyclopentyl-4-hydroxybenzoic acid;
3,5-di-tertiary-octyl-4-hydroxybenzoic acid.

The most preferred compounds are those in which each R is a tertiary alkyl with at most eight carbon atoms, for example, 3,5-di-tertiary-butyl-4-hydroxybenzoic acid and its salts and esters.

The triazines having the following formula can also be employed:

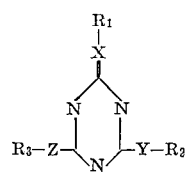

where $R_1$ and $R_2$ represent an alkyl group of from one to eighteen carbon atoms, for example, methyl, ethyl, propyl, butyl, pentyl, octyl, dodecyl and octadecyl, a cycloalkyl group of five to six carbon atoms, for example, cyclopentyl or cyclohexyl, a phenyl group or an alkyl phenyl group of from seven to twenty-four atoms, for example, methylphenyl, ethylphenyl, butylphenyl, octylphenyl, octadecylphenyl, dimethylphenyl, dibutylphenyl and dioctadecylphenyl, an alkoxyalkyl group of from three to fifteen atoms, for example, methoxymethyl, ethoxyethyl, butyoxyethyl, n-lauryloxyethyl, or an alkoxyphenyl group of from eight to nineteen carbon atoms, for example, meoxyphenyl, ethoxyphenyl, n-octyloxyphenyl or n-laurylxyphenyl. $R_3$ designates an alkyl hydroxyphenyl of from seven to twenty-four carbon atoms, for example, methylhydroxyphenyl, ethylhydroxyphenyl, butylhydroxyphenyl, thoxyphenyl, ethoxyphenyl, n-octyloxyphenyl or n-laurylhydroxyphenyl, methyl-di-t-butylhydroxyphenyl. X, Y and Z each designate a sulfur or oxygen atom or a substituted or unsubstituted imino group, preferably aralkyl imino, for example, benzylimino.

An additional class of triazines has the formula:

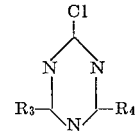

in which $R_4$ represents an alkylhydroxyanilino group, preferably one having seven to twenty-four carbon atoms, for example, methylhydroxyanilino, ethylhydroxyanilino, butylhydroxyanilino, octylhydroxyanilino, dodecylhydroxyanilino, octadecylhydroxyanilino, di-t-butylhydroxyanilino and methyl-di-t-butylhydroxyanilino, or an alkyl thioalkoxy group, preferably having from one to eighteen carbon atoms, for example, thiomethyl, thioethyl, thiopropyl, thiobutyl, thiooctyl, thiododecyl and thiooctadecyl, and $R_5$ represents an alkylhydroxyaniline group, preferably one corresponding to the definition of $R_4$.

Exemplary compounds coming within one or both of the above triazine formulae are:

6-(4-hydroxy-3,5-di-t-butylanilino)-2,4-bis-(n-thiooctyl)-1,3,5-triazine;
6-(4-hydroxy-3,5-di-t-butylanilino)-2,4-bis-thiophenyl-1,3,5-triazine;
6-(4-hydroxy-3,5-di-t-butylanilino)-2,4-bis-thiooctadecyl-1,3,5-triazine;
6-(4-hydroxy-3,5-di-t-butylanilino)-2,4-bis-thio-cyclohexyl-1,3,5-triazine;
6-(2-hydroxy-3,5-di-t-butyl-6-methylanilino)-2,4-bis-(n-thiooctyl)-1,3,5-triazine;
6-(4-hydroxy-3,5-di-t-butylanilino)-4-n-thiooctyl-2-chlor-1,3,5-triazine;
4,6-bis-(4-hydroxy-3,5-di-t-butyl-anilino)-2-chlor-1,3,5-triazine.

Additional stabilizers which can be used include:

hydroxyethyl ethylene diamine triacetic acid;
nitrilotriacetic acid;
ethylene diamine tetraacetic acid;
2,4,6-tris-2-hydroxyphenyl-1,3,5-trithiane;
2,4,6-tris-2-hydroxyphenyl-1,3,5-triazine;
2,4-dihydroxyphenyl furyl ketone;
2,2'-dihydroxy-4,4'-diethoxybenzil;
2-hydroxy benzaldehyde bis(n-dodecylmercaptal);
tri-n-dodecyl-phosphoramide;
tri-cyclohexyl-phosphoramide;
hexamethyl-phosphoramide;
octamethyl-pyrophosphoramide;
2-cyano-3-p-dodecylanilino acrylonitrile;
2-ethylhexyl(2-cyano-3-N-methylanilino)acrylate;
oxalic acid, oxanilide, p-ethoxy-oxanilide;
N,N'-diethyldithioxamide;
N,N'-di-n-dodecyldithio oxamide;

N,N'-di-cyclohexyldithio oxamide;
N,N'-diamino oxamidine salts (acetate, benzoate, phosphate);
N,N'-dianilino oxamidine;
2-ethylhexyl(4-hydroxy-3,5-di-tertiary-butyl-α-cyano-cinnamate;
n-butyl-(β-phenyl-α-cyano-cinnamate);
2-(4-hydroxy-3-methylphenyl) benzotriazole oxide.

The stabilizer is incorporated in the polymer in suitable mixing equipment, such as a mill or a Banbury mixer. If the olefin polymer has a melt viscosity which is too high for the desired use, the olefin polymer can be worked until its melt viscosity has been reduced to the desired range before addition of the stabilizer. However, olefin polymers in a range of workable melt viscosities are now available. Mixing is continued until the mixture is substantially uniform. The resulting composition is then removed from the mixing equipment and brought to the size and shape desired, for marketing or use.

The following examples represent embodiments of polypropylene stabilized with phosphates in accordance with the invention:

EXAMPLE I

A stabilized polypropylene composition was prepared using as the phosphate stabilizer the phosphate of Example 9, together with a metal salt, zinc 2-ethyl hexoate. The phosphate, phenol and metal salt were blended together to yield a stabilizer of the following composition:

Stabilizer composition: Parts by weight
Tetra tridecyl - 4,4' - n - butylidene - bis - (2-tertiary - butyl - 5 - methyl - phenyl) diphosphate _____ 375
Zinc 2-ethylhexoate _____ 125

The stabilizer blend was dispersed by hand-stirring in powdered, previously unstabilized polypropylene (Pro-Fax 6501, reduced specific viscosity (RSV) 3.0, melt index 0.4, ASTM D1238–57T at 190° C.) in an amount of 0.5% stabilizer by weight of the resin. The mixture was placed on a 2-roll mill and fluxed for five minutes at 170±2° C. Pieces cut from the milled sheet were used in the standard tests described below. The standard sample used in testing was 200 g., except for the Brabender Plastograph, which was 35 g. The stabilizers were incorporated as described in the working example and milled to a sheet. Pieces cut from the milled sheet were then used in the test procedures.

Brabender plastograph (reduction in melt viscosity)

This instrument is essentially a heated sigma-blade mixer in which the torque applied to the blades at 60 r.p.m. is continuously measured and plotted on a chart as kg.-cm. of torque. The bowl is maintained at 193° C. The charge is 35 g. polypropylene. Temperature of the plastic is 205–215° C., owing to frictional heat build-up.

Oven test, 205° C. (heat stability)

Small squares cut from a milled sheet are exposed in a forced-draft air oven lying flat on aluminum foil. Samples are removed at 15 minute intervals and examined for loss of shape, flow-out, or melting, which constitute failure. Color is noted at failure.

Compression molding, 190° C. (resistance to embrittlement and loss of plasticity)

Pieces cut from a milled sheet are compression-molded at 190° C. for five minutes to give 6 x 6 inch slabs 20 mils (about 0.5 mm.) or 75 mils thick. Plasticity and color are then noted.

Heat aging, 150° C. oven (heat stability of molded samples)

Molded samples made as above are heated flat on aluminum foil in an air circulating oven at 150° C. Samples are removed daily and examined for cracking or powdering, either of which constitutes failure. Color is noted at the end of two days, if the sample has not yet failed.

Weatherometer (resistance to light deterioration)

The molded samples were held in a weatherometer at 51° C. black panel temperature, and noted every 16⅔ hours for development of cracking, either of which constitutes failure. Color is noted at the end of fifty hours.

Reduction in melt viscosity was small in forty-five minutes, and heat stability as measured by the Oven Test, resistance to embrittlement and loss of plasticity as noted by the Compression Molding Test, resistance to heat aging of the molded samples, and resistance to light deterioration, are all rated as excellent.

EXAMPLES II TO V

The phosphate compounds of this invention are especially effective in stabilizing olefin polymers which are intended for use in products which will be exposed to hot water, as, for example, in washing machines.

The stabilizers set forth in Table I below were mixed with dilauryl thiodipropionate, and dispersed by hand stirring into previously unstabilized polypropylene (Pro-Fax 6501) and then fluxed, and cut into pieces as in Example I. Pieces cut from the milled sheet were heat aged in an oven at 150° C., as compounded, and either after seven days and fourteen days in boiling water, or after seven days and fourteen days in boiling 1% aqueous detergent solution. The results of the heat aging tests are set forth in Table I below.

TABLE I

| Example No. | II | III | IV | V |
|---|---|---|---|---|
| Polypropylene | 100 | 100 | 100 | 100 |
| Dilauryl thiodipropionate | 0.3 | 0.3 | 0.25 | 0.25 |
| Phosphate of Example 9 | 0.1 | | 0.25 | |
| Phosphate of Example 14 | | 0.1 | | 0.25 |
| Oven aging, 150° C., days: | | | | |
| (a) As compounded | 20 | 18 | 22 | 26 |
| (b) After 7 days in boiling water | 14 | 15 | | |
| (c) After 14 days in boiling water | 13 | 13 | | |
| (d) After 7 days in boiling 1% detergent [1] | | | 13 | 13 |
| (e) After 14 days in boiling 1% detergent [1] | | | 6 | 8 |

[1] Detergent formulation based on sodium dodecyl benzene sulfonate, pentasodium tripolyphosphate, sodium carboxymethylcellulose and fillers.

The results show that the phosphates are resistant to a loss of heat stabilizing effectiveness after exposure of the polymer to hot water and to hot detergent solutions. This is of practical significance in the use of polypropylene in electrical washing appliance parts.

EXAMPLE III

Two stabilized polypropylene compositions were prepared, using a blend of phosphate and metal salt, 4,4'-n-butylidene-bis(2-tertiary-butyl-5-methyl phenol), 2-ethylhexyl - 2,2' - methylene - bis(4-methyl-6,1'-methyl-cyclohexyl) phenyl phosphate, and zinc 2-ethylhexoate, of the following composition:

Stabilizer composition: Parts by weight
4,4' - n-butylidene-bis(2-tertiarybutyl-5-methyl phenol) _____ 100
2-ethylhexyl - 2,2' - methylene-bis(4-methyl-6,1'-methylcyclohexyl)phenyl phosphate _____ 275
Zinc 2-ethylhexoate _____ 125

This composition was blended with polypropylene (Pro-Fax 6501) in an amount of 0.6%, and then tested by the standard 150° C. oven heat-aging test in comparison with a similar composition containing the blend in an amount of 0.7%, with the addition of 0.3% dilauryl thiodipropionate. The composition without the dilauryl thiodipropionate was stable for six days, and the composition with the thiodipropionate, for twenty-four days. Both compositions were colorless at the end of two days.

Reduction in melt viscosity was small in 45 minutes and heat stability, resistance to embrittlement and loss of plasticity at low and high temperature, and resistance to light deterioration, are all rated as excellent.

Having regard to the foregoing disclosure, the following is claimed as the inventive and patentable embodiments thereof:

1. An alpha-olefin polymer composition having improved resistance to deterioration when heated comprising a mono-alpha-olefin polymer or polystyrene, an organic phosphate having only radicals directly attached to phosphorus through oxygen; and selected from the group consisting of hydrogen, aliphatic, cycloaliphatic, and aromatic groups, and heterocyclic groups having in addition to carbon an atom selected from the group consisting of nitrogen, oxygen and sulfur; said groups having from one to about thirty carbon atoms; and having attached to each phosphate group in the molecule, (a) at least one aliphatic or cycloaliphatic group, and (b) at least one aromatic polycarbocyclic group having the formula $$(Ar)_{n_1}-Y-(Ar)_{n_2}$$

wherein Ar is a carbocyclic aromatic group, of which at least one Ar is connected through an oxygen atom to a phosphorus of a phosphate group and at least one other Ar contains a free phenolic hydroxy group or is connected through an oxygen atom to a phosphorus of a phosphate group; $n_1$ and $n_2$ are numbers within the range from 1 to 4; Y is a polyvalent linking group selected from the group consisting of oxygen; sulfur; aliphatic; cycloaliphatic; aromatic attached to each Ar group through a carbon atom not a member of an aromatic ring; oxyaliphatic; thioaliphatic; oxycycloaliphatic; thiocycloaliphatic; heterocyclic having in addition to carbon an atom selected from the group consisting of nitrogen, oxygen and sulfur; carbonyl; sulfinyl; and sulfonyl; the phosphate being present in an amount sufficient to improve the resistance of the resin to deterioration; the salt of a metal of Group II of the Periodic Table and an organic non-nitrogenous monocarboxylic acid having from about 6 to about 24 carbon atoms; and a thiodipropionic acid ester.

2. An alpha-olefin polymer composition in accordance with claim 1, wherein the organic phosphate has the formula:

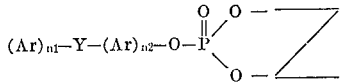

wherein Z is selected from the group consisting of hydrogen; aliphatic; cycloaliphatic; aromatic; heterocyclic and $(Ar)_{n_1}-Y-(Ar)_{n_2}$ groups, taken in sufficient number to satisfy the valences of the two phosphate oxygen atoms.

3. The polymer composition of claim 1 wherein the mono-alpha-olefin polymer is polypropylene.

References Cited

UNITED STATES PATENTS

| | | | |
|---|---|---|---|
| 2,564,646 | 8/1951 | Leistner et al. | 260—45.7 |
| 3,153,663 | 10/1964 | Sirrenberg et al. | 260—929 |
| 3,245,949 | 4/1966 | Murdock | 260—45.85 |
| 3,255,136 | 6/1966 | Hecker et al. | 260—23 |
| 3,297,631 | 1/1967 | Bown et al. | 260—45.95 |

DONALD E. CZAJA, Primary Examiner

V. P. HOKE, Assistant Examiner

U.S. Cl. X.R.

252—404, 406, 407; 260—45.7, 45.8, 45.85, 45.9, 45.95, 896, 897, 926

UNITED STATES PATENT OFFICE
CERTIFICATE OF CORRECTION

Patent No. 3,535,276    Dated 20 October 1970

Inventor(s) Hecker, Kauder and Leistner

It is certified that error appears in the above-identified patent and that said Letters Patent are hereby corrected as shown below:

Col. 2, line 5, "propsed" should be --proposed--.
Col. 3, lines 47-49, the formula should read:

I

Cols. 3-4, the formula following line 8 should read:

II  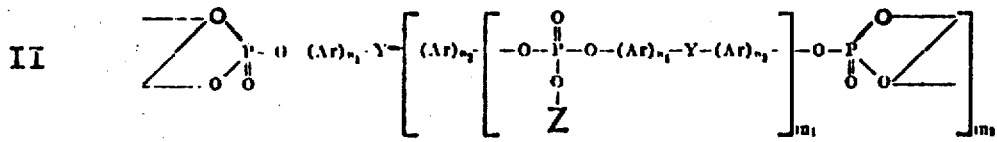

Col. 4, line 42, after "apparent" delete "then" and insert in its place --that when--.
Cols. 5-6, the second formula should be numbered--(VI)--, at the lefthand side.
Col. 5, at line 40, the formula should read:

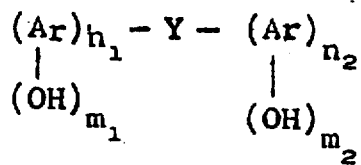

Col. 7, line 15, the formula should read: (the $^1$ refers to the footnote at line 43.)

$$-(S)\overset{1}{\underset{}{-}}\;;$$

Col. 7, line 68, the formula should read:

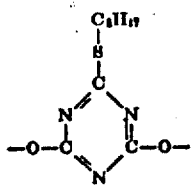

PO-1050
(5/69)

UNITED STATES PATENT OFFICE
CERTIFICATE OF CORRECTION

Patent No. 3,535,276    Dated _____

Inventor(s) _____

It is certified that error appears in the above-identified patent and that said Letters Patent are hereby corrected as shown below:

Col. 9, line 36, "X" should be --Z--.
Cols. 11-12, in Formula (11), the bond at the top of the second benzene ring should be corrected as shown below:

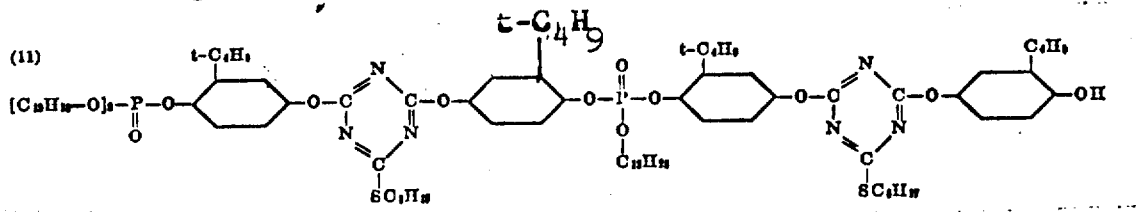

Col. 13, the last line of the last formula should read as follows:

Cols. 15-16, Formula (19) should appear as follows:

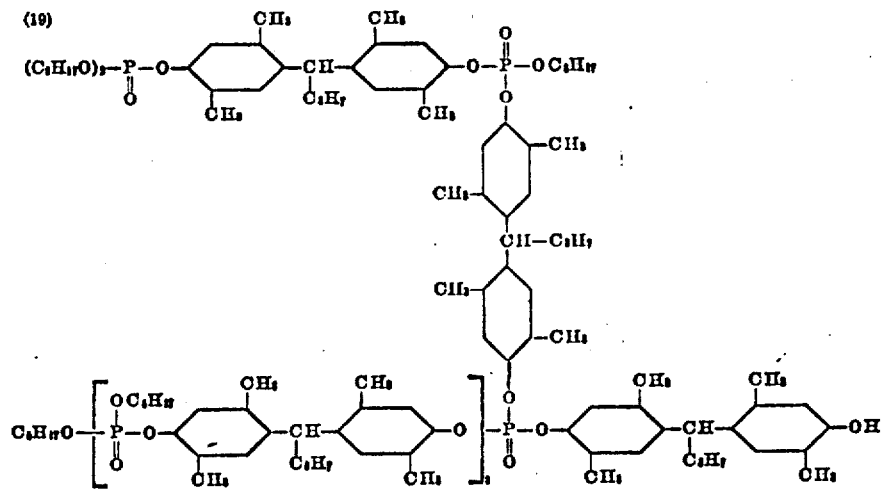

PO-1050
(5/69)

UNITED STATES PATENT OFFICE
CERTIFICATE OF CORRECTION

Patent No. 3,535,276                     Dated

Inventor(s)

It is certified that error appears in the above-identified patent and that said Letters Patent are hereby corrected as shown below:

Col. 20, line 16, "hydrided" should be --hydride--.
 "     "    25, Place a comma (,) between "triethylamine" and "tributylamine".
Col. 20, line 35, "dineopenyl" should be --dineopentyl--.
 "     "    33, "dinapthyl" should be --dinaphthyl--.
 "     "    42, "catlyst" should be --catalyst--.
Col. 21, line 6, "2,2-" preceding "butyli-" should be --2,2'-- --.
Col. 21, line 11, "isoporpylphenol" should be --isopropylphenol--.
Col. 21, line 12, "chloropenol" should be --chlorophenol--.
Col. 21, line 27, "cyclopenylidene" should be --cyclopentylidene--.
Col. 21, line 28, "ethylbutadene" should be --ethylbutylidene--.
Col. 22, line 59, "diphenylphospite" should be --diphenylphosphite--.
Col. 27, line 26, "60 C." should be --60° C.--.
Col. 31, line 17, "glycerol" should be --glyceryl--.
Col. 36, lines 13 through 18 should read:
  --thoxyphenyl, ethoxyphenyl, n-octyloxyphenyl or
n-lauryloxyphenyl. $R_3$ designates an alkyl hydroxyphenyl of from seven to twenty-four carbon atoms, for example, methylhydroxyphenyl, ethylhydroxyphenyl, butylhydroxyphenyl, octylhydroxyphenyl, octadecylhydroxyphenyl, di-t-butylhydroxyphenyl, methyl-di-t-butylhydroxyphenyl. X, Y --
Col. 40, line 10, the formula should read:

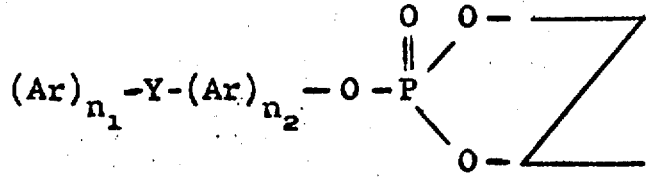

Signed and sealed this 6th day of April 1971.

(SEAL)
Attest:

EDWARD M. FLETCHER, JR.                WILLIAM E. SCHUYLER, JR.
Attesting Officer                      Commissioner of Patents